United States Patent
Smith et al.

(10) Patent No.: US 11,738,587 B2
(45) Date of Patent: Aug. 29, 2023

(54) ENVIRONMENTAL HISTORY MONITOR WITH POSITIONAL DISPLACEMENT AND SECURITY FEATURES

(71) Applicant: Temptime Corporation, Morris Plains, NJ (US)

(72) Inventors: Marielle K. Smith, Parlin, NJ (US); Mohannad Abdo, Clifton, NJ (US); Thi N. Do, West Orange, NJ (US); Brian S. Huffman, Belle Mead, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 0 days.

(21) Appl. No.: 17/666,071

(22) Filed: Feb. 7, 2022

(65) Prior Publication Data

US 2022/0161591 A1 May 26, 2022

Related U.S. Application Data

(63) Continuation of application No. 17/024,187, filed on Sep. 17, 2020, now Pat. No. 11,241,902.

(51) Int. Cl.
*B42D 25/378* (2014.01)
*B42D 25/29* (2014.01)
(Continued)

(52) U.S. Cl.
CPC ........... *B42D 25/378* (2014.10); *B42D 25/29* (2014.10); *B42D 25/405* (2014.10)

(58) Field of Classification Search
CPC .... B42D 25/378; B42D 25/29; B42D 25/405; G01K 3/04; G01K 11/12; G01K 11/06; G01K 11/20; B41M 3/144; G09F 3/0291; G09F 3/0294; G09F 2003/0276
USPC ...... 283/61, 62, 72, 81, 94, 95, 98, 99, 114; 422/82.12
See application file for complete search history.

(56) References Cited

U.S. PATENT DOCUMENTS 3,247,006 A 4/1966 Hoge
3,284,423 A 11/1966 Knapp
(Continued)

FOREIGN PATENT DOCUMENTS

CN 108256607 7/2018
CN 108682283 10/2018
(Continued)

OTHER PUBLICATIONS

The International Search Report and Written Opinion of International Searching Authority dated Jan. 18, 2012 issued for International PCT Application No. PCT/US11/53416.
(Continued)

*Primary Examiner* — Justin V Lewis
(74) *Attorney, Agent, or Firm* — K&L Gates LLP

(57) ABSTRACT

Environmental monitors for monitoring a predetermined environmental exposure, for example, an historical heat exposure such as a cumulative ambient heat exposure and/or a peak ambient heat exposure may include an environmental indicator material and a security material. The environmental monitor may be configured to attach to a host product for monitoring the predetermined environmental exposure of the host product, and additionally serve as an anti-counterfeiting indicator.

30 Claims, 9 Drawing Sheets

(51) Int. Cl.

| | |
|---|---|
| *B42D 25/405* | (2014.01) |
| *B42D 25/382* | (2014.01) |
| *B42D 25/41* | (2014.01) |
| *G01K 3/04* | (2006.01) |
| *G01K 11/12* | (2021.01) |
| *B42D 25/387* | (2014.01) |
| *B41M 3/14* | (2006.01) |
| *G01K 11/06* | (2006.01) |
| *G01K 11/20* | (2006.01) |
| *G09F 3/00* | (2006.01) |
| *G09F 3/02* | (2006.01) |

(56) References Cited

U.S. PATENT DOCUMENTS

| | | |
|---|---|---|
| 3,299,010 A | 1/1967 | Samour |
| 3,420,205 A | 1/1969 | Morison |
| 3,535,295 A | 10/1970 | Davis et al. |
| 3,612,053 A | 10/1971 | Pratt |
| 3,635,754 A | 1/1972 | Beede |
| 3,690,937 A | 9/1972 | Guse et al. |
| 3,838,079 A | 9/1974 | Kosaka et al. |
| 3,999,946 A | 12/1976 | Patel et al. |
| 4,189,399 A | 2/1980 | Patel |
| 4,199,646 A | 4/1980 | Hori et al. |
| 4,284,719 A | 8/1981 | Agerhem et al. |
| 4,299,880 A | 11/1981 | Arens |
| 4,323,557 A | 4/1982 | Rosso et al. |
| 4,384,980 A | 5/1983 | Patel |
| 4,389,217 A | 6/1983 | Baughman et al. |
| 4,404,243 A | 9/1983 | Terpay |
| 4,428,321 A | 1/1984 | Arens |
| 4,551,388 A | 11/1985 | Schlademan |
| 4,551,738 A | 11/1985 | Maruta et al. |
| 4,675,009 A | 6/1987 | Hymes et al. |
| 4,753,188 A | 6/1988 | Schmoegner |
| 4,788,151 A | 11/1988 | Preziosi et al. |
| 4,789,637 A | 12/1988 | Preziosi |
| 4,830,855 A | 5/1989 | Stewart |
| 4,880,683 A | 11/1989 | Stow |
| 4,917,503 A | 4/1990 | Bhattacharjee |
| 4,925,908 A | 5/1990 | Bernard et al. |
| 5,045,283 A | 9/1991 | Patel |
| 5,053,339 A | 10/1991 | Patel |
| 5,057,434 A | 10/1991 | Prusik et al. |
| 5,120,349 A | 6/1992 | Stewart et al. |
| 5,152,611 A | 10/1992 | Pieper et al. |
| 5,156,911 A | 10/1992 | Stewart |
| 5,254,473 A | 10/1993 | Patel |
| 5,289,547 A | 2/1994 | Ligas et al. |
| 5,368,905 A | 11/1994 | Ohno |
| 5,602,804 A | 2/1997 | Haas |
| 5,622,137 A | 4/1997 | Lupton et al. |
| 5,667,303 A | 9/1997 | Arens et al. |
| 5,686,153 A | 11/1997 | Heynderick» |
| 5,709,472 A | 1/1998 | Prusik et al. |
| 5,741,592 A | 4/1998 | Lewis |
| 5,756,356 A | 5/1998 | Yanagi et al. |
| 5,783,302 A | 7/1998 | Billel et al. |
| 5,822,280 A | 10/1998 | Haas |
| 5,964,181 A | 10/1999 | Pereyra |
| 5,997,927 A | 12/1999 | Gigs |
| 6,042,264 A | 3/2000 | Prusik |
| 6,043,021 A | 3/2000 | Manico et al. |
| 6,060,426 A | 5/2000 | Tan |
| 6,070,805 A | 6/2000 | Kaufman et al. |
| 6,410,896 B2 | 6/2002 | Witonsky |
| 6,524,000 B1 | 2/2003 | Roth |
| 6,544,925 B1 | 4/2003 | Prusik |
| 6,602,594 B2 | 8/2003 | Miyata |
| 6,614,728 B2 | 9/2003 | Spevacek |
| 6,642,016 B1 | 11/2003 | Sjoholm et al. |
| 6,741,523 B1 | 5/2004 | Bommarito et al. |
| 6,759,368 B2 | 7/2004 | Lelental et al. |
| 6,832,729 B1 | 12/2004 | Perry et al. |
| 6,916,116 B2 | 7/2005 | Diekmann et al. |
| 6,924,148 B2 | 8/2005 | Prusik |
| 6,957,623 B2 | 10/2005 | Guisinger et al. |
| 7,019,171 B1 | 3/2006 | Prusik et al. |
| 7,019,172 B2 | 3/2006 | Joshi et al. |
| 7,139,226 B2 | 11/2006 | Haas |
| 7,161,023 B2 | 1/2007 | Prusik et al. |
| 7,209,042 B2 | 4/2007 | Martin et al. |
| 7,442,237 B1 | 10/2008 | Gardner |
| 7,490,575 B2 | 2/2009 | Taylor et al. |
| 7,517,146 B2 | 4/2009 | Smith et al. |
| 7,682,830 B2 | 3/2010 | Prusik et al. |
| 7,891,310 B2 | 2/2011 | Taylor et al. |
| 8,067,483 B2 | 11/2011 | Prusik et al. |
| 8,122,844 B2 | 2/2012 | Smith et al. |
| 8,142,072 B2 | 3/2012 | Kinami |
| 8,430,053 B2 | 4/2013 | Taylor et al. |
| 8,671,871 B2 | 3/2014 | Huffman et al. |
| 9,546,911 B2 | 1/2017 | Huffman et al. |
| 9,563,798 B1 | 2/2017 | Laser et al. |
| 10,514,340 B2 | 12/2019 | Prusik et al. |
| 10,545,125 B2 | 1/2020 | Prusik et al. |
| 11,241,902 B1 | 2/2022 | Smith et al. |
| 2005/0211153 A1 | 9/2005 | Ribi et al. |
| 2006/0247967 A1 | 11/2006 | Prusik et al. |
| 2007/0076779 A1 | 4/2007 | Haarer |
| 2008/0004372 A1 | 1/2008 | Prusik et al. |
| 2008/0110391 A1 | 5/2008 | Taylor et al. |
| 2008/0233290 A1 | 9/2008 | Ward-Askey et al. |
| 2008/0269050 A1 | 10/2008 | Azizian et al. |
| 2009/0010803 A1* | 1/2009 | Ambrozy ............... G01K 5/00 374/E11.006 |
| 2009/0031921 A1 | 2/2009 | Ward-Askey |
| 2009/0044744 A1 | 2/2009 | Koene et al. |
| 2009/0092519 A1 | 4/2009 | Stewart et al. |
| 2009/0131718 A1 | 5/2009 | Baughman et al. |
| 2009/0301382 A1 | 12/2009 | Patel |
| 2010/0034961 A1 | 2/2010 | Tenetov et al. |
| 2010/0247900 A1 | 9/2010 | Parker |
| 2010/0264640 A1 | 10/2010 | Lane |
| 2011/0086995 A1 | 4/2011 | Castillo Martinez et al. |
| 2012/0079980 A1 | 4/2012 | Taylor et al. |
| 2012/0079981 A1 | 4/2012 | Huffman et al. |
| 2012/0174853 A1 | 7/2012 | Wilson |
| 2013/0239874 A1 | 9/2013 | Smith et al. |
| 2014/0144366 A1 | 5/2014 | Huffman et al. |
| 2015/0247760 A1 | 9/2015 | Ambrosy et al. |
| 2016/0154939 A1 | 6/2016 | Grabiner et al. |
| 2016/0292486 A1 | 10/2016 | Prusik et al. |
| 2017/0193260 A1 | 7/2017 | Prusik et al. |
| 2018/0345713 A1 | 12/2018 | Weiss et al. |
| 2019/0197377 A1 | 6/2019 | Studnicka |
| 2020/0165038 A1 | 5/2020 | Weisbecker et al. |

FOREIGN PATENT DOCUMENTS

| | | |
|---|---|---|
| JP | 11-140339 | 5/1999 |
| JP | 2008-203065 | 9/2008 |
| JP | 2009-515202 | 4/2009 |
| KR | 20040077342 | 9/2004 |
| RU | 2131117 | 5/1999 |
| WO | WO 99/39197 | 8/1999 |
| WO | WO 2007/035365 | 3/2007 |
| WO | WO 2007/118933 | 10/2007 |
| WO | WO 2010/068279 | 6/2010 |
| WO | WO 2012/044655 | 4/2012 |
| WO | WO2013058991 | 4/2013 |

OTHER PUBLICATIONS

International Search Report and Written Opinion of International Searching Authority dated Dec. 2, 2013 issued for International PCT Application No. PCT/US13/40824.

Office Action dated Mar. 13. 2019 issued for corresponding Korean patent application No. 10-2014-7033160.

(56) References Cited

OTHER PUBLICATIONS

Dow Polyethylene—Carbowax PEGs, downloaded on Mar. 9, 2012 from http://www.dow.com/polyglycols/polyethylene/products/carbowaxp.htm and list of products.
Wang, et al., "Thermo-Sensitive Materials for the Time-Temperature Indicator", 2011, Advanced Materials Research, 284-286, 2442.
Tan Guomin, "Special Ty Paper", Chemical Industry Press, Mar. 2005.
S.H. Lee et al., Viscosity and Diffusion Constants Calculation of n-Alkanes by Molecular Dynamics Simulations, Bull, Korean Chem. Soc., 2003, vol. 24, No. 11, pp. 1590-1598.
O'Leary et al. "Copolymers of poly(n-alkyl acrylates): synthesis, characterization, and monomer reactivity ratios", Polymer 2004 45 pp. 6575-6585.
Greenberg et al. "Side Chain Crystallization of n-Alkyl Polymethacrylates and Polyacrylates" J. Am. Chem. Soc. 1954, 76 (24), pp. 6280-6285.
Flanagan, Handbook of Adhesive Bonding (McGraw-Hill Book Co. 1973) ch. 8, pp. 1-17.
Landrock, Adhesives Technology Handbook (Noyes Publications, 1985) pp. 154-156.
Miyauchi, J. Polymer Sci.: A New Composite Resistor with PTC Anomaly, Polymer Chem. Edition 19:1871-1873 (1981).
Satas, Handbook of Pressure Sensitive Adhesive Technology (Van Nostrand Reinhold Co. Inc., 1982) ch. 4, pp. 50-77. ch. 13, pp. 299-330, ch. 14, pp. 331-425, ch. 29, pp. 575-558.
Temin, Encyclopedia of Polymer Science and Engineering vol. 13 (John Wiley & Son's, 1988) pp. 345-368.
Office Action dated Jun. 20, 2022 issued for Belgian Patent Application No. 2021/5726.

* cited by examiner

| Test Conditions | Normal Lighting | UV Lighting |
|---|---|---|
| Before Exposure | A  | B  |
| After Exposure | C  | D  |

| Test Conditions | Normal Lighting | UV Lighting |
|---|---|---|
| Before Exposure | A  | B  |
| After Exposure | C  | D  |

| Test Conditions | Normal Lighting | UV Lighting |
|---|---|---|
| Before Exposure | A | B |
| After Exposure | C | D |

| Test Conditions | Normal Lighting | Seconds After UV Light Exposure |
|---|---|---|
| Before Heating[1] |  A |  B |
| After Heating |  C |  D |

ENVIRONMENTAL HISTORY MONITOR WITH POSITIONAL DISPLACEMENT AND SECURITY FEATURES

CROSS-REFERENCE TO A RELATED APPLICATION AND PRIORITY CLAIM

The present application is a continuation application of U.S. patent application Ser. No. 17/024,187 filed on Sep. 17, 2020, entitled, "Environmental History Monitor with Positional Displacement and Security Features", the entire disclosure of which is incorporated by reference herein in its entirety.

FIELD

This disclosure is generally directed to the field of environmental monitors, including historical temperature exposure monitors, such as a predetermined cumulative ambient heat exposure and/or a predetermined peak ambient heat exposure. The disclosed monitors may include a security material which may be used for other purposes such as anti-counterfeiting protection.

BACKGROUND

Many commercial products are temperature-sensitive or perishable and may lose efficacy or quality if they experience excessive ambient heat exposure before they are used. Examples of heat-sensitive commercial products include certain pharmaceuticals, medical products, and foodstuffs as well as some industrial products. Temperature monitors are known which can provide a simple visual indication of the historical exposure of a host product to heat, e.g., cumulative or peak heat exposure. An indicator provided close to or on the product package is exposed over time to temperatures close to those experienced by the product itself. The visual indication can be used to provide a signal of whether a product may have lost quality, or freshness. Some temperature monitors can integrate over time historical temperature exposure to various conditions in a predictable, quantitative manner and can be used to monitor cumulative heat exposure to indicate the useful shelf life of temperature-sensitive or perishable host products, or for other purposes. Product may also be sensitive or perishable in response to other environmental factors, such as humidity, radiation, oxygen exposure, exposure to biologic materials of certain types, etc.

Known temperature monitors based on chemical, or electrochemical, or other physical changes in a monitor material may be cheaper can provide a color change at a predetermined end point to indicate possible loss of quality or freshness of the host product. The color change can be displayed in a suitable label, or the like, to be read optically, for example, visually by a human viewer or by an electronic device such as a bar code scanner or cell phone. The color change can be chromatic or achromatic or provided by another visually detectable optical parameter change. The temperature-response parameters over time of the temperature monitor can be configured to correlate with a deterioration characteristic of the host product to coordinate the color change appropriately with the likely condition of the host product. Other types of environmental exposure may behave in a similar fashion in response to exposure to humidity, oxygen, radiation, biologics, or other types of environmental factors that may affect host product acceptability.

Some known temperature monitors employ diacetylenic monomer compounds that polymerize in response to environmental conditions such as temperature exposure to provide a color change. See, for example, U.S. Patent Application Publication Nos. 2009/0131718; 2011/0086995; and 2008/0004372; and U.S. Pat. Nos. 4,789,637; 4,788,151; 5,254,473; 5,053,339; 5,045,283; 4,189,399; 4,384,980; and 3,999,946.

Some other temperature monitors employ diffusion technology, for example, U.S. Pat. Nos. 6,741,523; 6,614,728; and 5,667,303; and U.S. Patent Application Publication No. 2003/0053377. In addition to diffusion, other types of temperature or heat exposure monitors also rely on other kinds of movement of an indicator material in response to an environmental exposure, for example, freeze indicators where freezing of a liquid breaks a container, releasing a colorant, or peak temperature indicators that release a liquid which flows when a meltable solid melts.

Also, certain temperature-sensitive or perishable products, for example, vaccines and sensitive medications, as well as some foodstuffs and other products including some industrial products can have their quality or safety compromised by relatively brief exposures to a temperature in excess of a predetermined threshold. Various devices are known for monitoring such temperature exposures, including those in U.S. Pat. Nos. 7,517,146; 5,709,472; and 6,042,264.

Further, U.S. Pat. No. 5,057,434 to Prusik et al. ("Prusik et al. '434'" herein) relates to an improved temperature monitor device useful in monitoring the environmental exposure of products that undergo progressive quality changes in response to such exposures. See, e.g., column 1, lines 5-8 of Prusik et al. '434. As described, a cumulative temperature monitor and a threshold indicator may be integrated into a single device. Further, the device may gradually and irreversibly develop color as a function of time and temperature and more closely monitor the actual condition of a deteriorative product than does a single indicator, See, e.g., abstract of Prusik '434. The capabilities of the system may be enhanced by a barrier layer that delays the color development action. See, e.g., column 9, lines 25-33.

All of the above types of environmental indicators may be enhanced, for example, by adding other features, e.g., anti-counterfeiting features, using examples approaches described in the present disclosure.

SUMMARY

Disclosed herein are environmental monitors for monitoring a predetermined environmental exposure, such as such as a predetermined cumulative ambient heat exposure and/or a predetermined peak ambient heat exposure; and for other purposes such as securely monitoring the authenticity of the environmental monitor or a host product that the environmental monitor is associated with.

Aspects of the subject matter described herein may be useful alone or in combination with one or more other aspects described herein. In an aspect of the present disclosure, a historical temperature exposure monitor includes a substrate. The historical temperature exposure monitor also includes an optically readable, thermally sensitive indicator element supported by the substrate. Additionally, the indicator element further includes an indicator material configured to move in response to a predetermined temperature exposure. The historical temperature exposure monitor also includes a security material supported by the substrate. The security material further includes a luminescent material configured to give a bright appearance of a predetermined color when exposed to specific light wavelengths or a photochromic material configured to change color state when exposed to the specific light wavelengths.

In another aspect of the present disclosure, which may be used in combination with any other aspect or combination of aspects listed herein, the predetermined temperature exposure is selected from the group consisting of freezing exposure, thawing exposure, peak temperature exposure, cumulative heat exposure, and combinations thereof.

In another aspect of the present disclosure, which may be used in combination with any other aspect or combination of aspects listed herein, the security material includes the luminescent material which is, prior to exposure to the specific light wavelengths, undetectable to the naked eye under normal lighting conditions, or the security material includes the photochromic material which is undetectable to the naked eye under normal lighting conditions before it changes color state responsive to being exposed to the specific light wavelengths.

In another aspect of the present disclosure, which may be used in combination with any other aspect or combination of aspects listed herein, the security material includes the luminescent material and the bright appearance of a predetermined color is undetectable to the naked eye, or the security material includes the photochromic material which is undetectable to the naked eye after it changes color state when exposed to the specific light wavelengths.

In another aspect of the present disclosure, which may be used in combination with any other aspect or combination of aspects listed herein, the specific light wavelengths are in a range selected from the group consisting of about 10-400 nm, about 10-380 nm, about 10-100 nm, about 100-280 nm, about 280-315 nm, about 315-400 nm, about 180-380 nm, about 180-400 nm, about 100-400 nm, about 100-315 nm, about 280-400 nm, about 400-500 nm, about 700 nm-1 mm, about 700 nm-1.1 µm, about 780 nm-1.4 µm, about 1.4-3 µm, and about 3 µm-1 mm.

In another aspect of the present disclosure, which may be used in combination with any other aspect or combination of aspects listed herein, the security material includes the luminescent material which comprises at least one component selected from the group consisting of: a phosphorescent material, a fluorescent material, a phosphorescent dye, a phosphorescent ink, a fluorescent dye, a fluorescent ink, a photochromic material, an irreversibly photochromic material, a photochromic ink, a photochromic dye, an infrared-reflecting material, an ultraviolet-reflecting material, an infrared-absorbing material, an ultraviolet-absorbing material, an optically refractive material, an optically diffractive material, a holographic material, Strontium Aluminate, CaS, ZnS, Sift, and a phosphorescent pigment powder.

In another aspect of the present disclosure, which may be used in combination with any other aspect or combination of aspects listed herein, the security material includes the photochromic material, which comprises at least one component selected from the group consisting of an organic metal compound including triarylmethanes, stilbenes, azastilbenes, nitrones, fulgides, spiropyrans, naphthopyrans, spiro-oxazines, quinones, photochromic quinones, phenoxynaphthacene quinone, diarylethenes, azobenzenes, and dithizonates of metals; an inorganic photochromic compound including silver chloride, silver halides, zinc halides, yttrium oxyhydride, silicate photochromic glasses containing silver halide microcrystals including AgBr or AgCl, activated crystals of alkali metal-halide compounds including KCl, KBr or NaF, and doped salts or oxides of alkaline-earth metals including $CaF_2$/La, Ce or $SrTiO_3$/Fe+Mo; a photochromic coordination compound including a sodium nitroprusside compound or a ruthenium sulfoxide compound; and combinations thereof.

In another aspect of the present disclosure, which may be used in combination with any other aspect or combination of aspects listed herein, the security material includes the photochromic material, which comprises at least one component selected from the group consisting of spiropyrans, naphthopyrans, and spiro-oxazines.

In another aspect of the present disclosure, which may be used in combination with any other aspect or combination of aspects listed herein, the luminescent material is configured to give the bright appearance of the predetermined color when exposed to the specific light wavelengths, and the bright appearance of the predetermined color remains for at least a predetermined interval after cessation of illumination with the specific light wavelengths.

In another aspect of the present disclosure, which may be used in combination with any other aspect or combination of aspects listed herein, the predetermined interval is about 0.1-60 seconds.

In another aspect of the present disclosure, which may be used in combination with any other aspect or combination of aspects listed herein, the predetermined interval is about 1-15 seconds.

In another aspect of the present disclosure, which may be used in combination with any other aspect or combination of aspects listed herein, the luminescent material includes an UV ink selected from the group consisting of a green UV ink, a blue UV ink, a pink UV ink, a yellow UV ink, a red UV ink, a clear UV ink, and combinations thereof.

In another aspect of the present disclosure, which may be used in combination with any other aspect or combination of aspects listed herein, the luminescent material is a phosphorescent component selected from the group consisting of Green Phosphorescent Pigment Powder, Red ZnS Phosphorescent Pigment Powder, Red CaS Phosphorescent Pigment Powder, Strontium Aluminate, CaS, ZnS, $SiO_2$, Calcium Sulfide, Strontium Aluminate Euporium Dysprosium, Yttrium Oxide, ZnS:Cu, and combination thereof.

In another aspect of the present disclosure, which may be used in combination with any other aspect or combination of aspects listed herein, the indicator element is inactive below a base temperature and being thermally responsive at or above an activation temperature to record irreversibly with respect to time cumulative ambient temperature exposure above the activation temperature, the activation temperature being equal to or greater than the base temperature.

In another aspect of the present disclosure, which may be used in combination with any other aspect or combination of aspects listed herein, the indicator material is a meltable solid at or below the base temperature in its initial state, and melts to be a viscous liquid at or above a determined temperature and begins to flow.

In another aspect of the present disclosure, which may be used in combination with any other aspect or combination of aspects listed herein, the indicator element comprises a transport member supporting the indicator material, a displacement of the indicator material is a displacement with respect to the transport member, and a displacement of the security material is a displacement with respect to the transport member.

In another aspect of the present disclosure, which may be used in combination with any other aspect or combination of aspects listed herein, the security material is mixed into and is part of the indicator material, so that the security material is displaced with respect to the transport member together with the indicator material, and the displacement of the security material is the same as the displacement of the indicator material.

In another aspect of the present disclosure, which may be used in combination with any other aspect or combination of aspects listed herein, the security material is not part of the indicator material and the displacement of the indicator material conceals or reveals the security material.

In another aspect of the present disclosure, which may be used in combination with any other aspect or combination of aspects listed herein, the change of color state of the photochromic material is a change in reflectivity, a change in transparency, a change in hue, and/or a change in apparent color when exposed to the specific light wavelengths.

Aspects of the subject matter described herein may be useful alone or in combination with one or more other aspects described herein. In an aspect of the present disclosure, an environmental monitor includes a substrate and an environmental indicator material supported by the substrate. The environmental indicator material configured to change its color state responsive to a predetermined environmental exposure other than light exposure. The environmental monitor also includes a security material supported by the substrate, the security material being either a photochromic material configured to change its color state when exposed to specific light wavelengths or a luminescent material configured to give a bright appearance of a predetermined color when exposed to the specific light wavelengths.

In another aspect of the present disclosure, which may be used in combination with any other aspect or combination of aspects listed herein, the environmental indicator material is configured to irreversibly change its color state responsive to the predetermined environmental exposure.

In another aspect of the present disclosure, which may be used in combination with any other aspect or combination of aspects listed herein, the environmental indicator material is configured to semi-reversibly change its color state responsive to the predetermined environmental exposure, and to maintain the changed color state until the environmental exposure falls below a second lower exposure threshold.

In another aspect of the present disclosure, which may be used in combination with any other aspect or combination of aspects listed herein, the environmental monitor is selected from the group consisting of a radiation exposure monitor, a humidity exposure monitor, an oxygen exposure monitor, a freeze monitor, a thaw monitor, a peak heat exposure monitor, and a cumulative heat exposure monitor, a current temperature indicator, a pH indicator, and combinations thereof.

In another aspect of the present disclosure, which may be used in combination with any other aspect or combination of aspects listed herein, the security material is mixed with, positioned under, or positioned over the environmental indicator material.

In another aspect of the present disclosure, which may be used in combination with any other aspect or combination of aspects listed herein, the security material is proximate to the environmental indicator material on the substrate.

In another aspect of the present disclosure, which may be used in combination with any other aspect or combination of aspects listed herein, the change of color state of the environmental indicator material is selected from the group consisting of a change in reflectivity, a change in transparency, a change in hue, a change in apparent color, darkening, lightening, and combinations thereof.

In another aspect of the present disclosure, which may be used in combination with any other aspect or combination of aspects listed herein, the environmental monitor is configured so that the change in color state of the environmental indicator material responsive to the predetermined environmental exposure is not detectable by naked eye under normal lighting conditions after the predetermined environmental exposure.

In another aspect of the present disclosure, which may be used in combination with any other aspect or combination of aspects listed herein, the change of the color state of the environmental indicator material is a change of transparency.

In another aspect of the present disclosure, which may be used in combination with any other aspect or combination of aspects listed herein, the change of the color state of the environmental indicator material is a change of transparency which reveals or hides the security material.

In another aspect of the present disclosure, which may be used in combination with any other aspect or combination of aspects listed herein, the environmental indicator material in its initial color state is opaque and has a first color prior to the predetermined environmental exposure, and a background beneath the environmental indicator material has a background color. The first color and the background color are the same or similar so that no color contrast is detectable by naked eye under normal lighting conditions between the first color and the background color. When the environmental indicator material has been exposed to the predetermined environmental exposure and changes its color state to be transparent, the background and the security material are revealed, so that the environmental monitor does not change apparent color detectable by naked eye under normal lighting conditions and so the security material is visible only when both the environmental indicator material is transparent and the security material has been exposed to the specific light wavelengths.

In another aspect of the present disclosure, which may be used in combination with any other aspect or combination of aspects listed herein, the specific light wavelengths are in a range selected from the group consisting of about 10-400 nm, about 10-380 nm, about 10-100 nm, about 100-280 nm, about 280-315 nm, about 315-400 nm, about 180-380 nm, about 180-400 nm, about 100-400 nm, about 100-315 nm, about 280-400 nm, about 400-500 nm, about 700 nm-1 mm, about 700 nm-1.1 µm, about 780 nm-1.4 µm, about 1.4-3 µm, and about 3 µm-1 mm.

In another aspect of the present disclosure, which may be used in combination with any other aspect or combination of aspects listed herein, the security material is the luminescent material and the bright appearance of the predetermined color is invisible/undetectable to naked eye under normal lighting conditions.

In another aspect of the present disclosure, which may be used in combination with any other aspect or combination of aspects listed herein, the environmental indicator material changes color state responsive to temperature.

In another aspect of the present disclosure, which may be used in combination with any other aspect or combination of aspects listed herein, the environmental indicator material comprises a meltable solid, and is configured to change color state in response to the melting of the meltable solid at a predetermined temperature, the color state change persisting after the meltable solid re-solidifies.

In another aspect of the present disclosure, which may be used in combination with any other aspect or combination of aspects listed herein, the meltable solid comprises a polymer having side chain crystallinity (SCC).

In another aspect of the present disclosure, which may be used in combination with any other aspect or combination of aspects listed herein, the meltable solid comprises at least one of an alkane, an alkyl ester, or a wax.

In another aspect of the present disclosure, which may be used in combination with any other aspect or combination of aspects listed herein, the environmental indicator material includes an active diacetylenic compound configured to change its color state in response to cumulative heat exposure over time.

In another aspect of the present disclosure, which may be used in combination with any other aspect or combination of aspects listed herein, the environmental indicator material is opaque in its initial color state and is positioned over the security material, so that the security material and the substrate are obscured by the environmental indicator material in its initial color state, and are revealed once the environmental indicator material has been exposed to the predetermined environmental exposure and changes its color state to be transparent.

In another aspect of the present disclosure, which may be used in combination with any other aspect or combination of aspects listed herein, the environmental monitor further includes a reference component supported by the substrate in a layered configuration as a reference layer having a reference ring with an opaque color and a viewing window being transparent or a hole. The reference layer is positioned over the environmental indicator material, and the reference ring has a third color similar in color or hue to a second color of the substrate or darker in appearance than the second color of the substrate. The substrate is viewable through the viewing window of the reference layer after the predetermined environmental exposure.

In another aspect of the present disclosure, which may be used in combination with any other aspect or combination of aspects listed herein, the predetermined environmental exposure is a predetermined heat exposure.

In another aspect of the present disclosure, which may be used in combination with any other aspect or combination of aspects listed herein, the predetermined heat exposure is a predetermined cumulative ambient heat exposure.

In another aspect of the present disclosure, which may be used in combination with any other aspect or combination of aspects listed herein, the predetermined heat exposure is a predetermined peak ambient heat exposure.

In another aspect of the present disclosure, which may be used in combination with any other aspect or combination of aspects listed herein, the environmental monitor is configured to change color detectable by naked eye under normal lighting conditions after the predetermined environmental exposure.

In another aspect of the present disclosure, which may be used in combination with any other aspect or combination of aspects listed herein, the environmental indicator material in its initial color state has a first color, the substrate has a second color, and the first color is different from the second color so that a color contrast can be detected by naked eye under normal lighting conditions between the first and the second colors. When the environmental indicator material has been exposed to the predetermined environmental exposure and changes its color state to be transparent, the substrate and the luminescent material are revealed, and the environmental monitor changes color detectable by naked eye under normal lighting conditions.

In another aspect of the present disclosure, which may be used in combination with any other aspect or combination of aspects listed herein, the first color is white or light color, and the second color is a dark color darker than the first color.

In another aspect of the present disclosure, which may be used in combination with any other aspect or combination of aspects listed herein, the environmental monitor further includes a reference component supported by the substrate in a layered configuration as a reference layer having a reference ring with an opaque color and a viewing window being transparent or a hole. The reference layer is positioned over the environmental indicator material. Additionally, the substrate has a dark color, similar in color or hue to the reference ring or darker in appearance than the reference ring, and the substrate is viewable through the viewing window of the reference layer after the predetermined environmental exposure.

In another aspect of the present disclosure, which may be used in combination with any other aspect or combination of aspects listed herein, the environmental indicator material includes a meltable solid and is configured to form a first layer. The security material is mixed with the same meltable solid and configured to form a second layer. The second layer is positioned between the first layer and the substrate. The meltable solid is opaque in its initial color state so that the security material and the substrate are obscured. Additionally, the meltable solid melts to irreversibly change its color state from opaque to be transparent responsive to the predetermined heat exposure so to reveal the luminescent material and the substrate.

In another aspect of the present disclosure, which may be used in combination with any other aspect or combination of aspects listed herein, the environmental indicator material has a first color which is a white or light color, the substrate has a second color which is the same as or similar to the first color so that no color contrast is detectable by naked eye under normal lighting conditions between the first color and the second color, and the environmental monitor does not change its apparent color to the naked eye under normal lighting conditions after the predetermined environmental exposure.

In another aspect of the present disclosure, which may be used in combination with any other aspect or combination of aspects listed herein, the environmental monitor further includes a reference component supported by the substrate in a layered configuration as a reference layer having a reference ring with an opaque color and a viewing window being transparent or a hole. The reference layer is positioned over the first layer, and the reference ring has a third color similar in color or hue to the second color of the substrate or darker in appearance that the second color of the substrate. The substrate is viewable through the viewing window of the reference layer after the predetermined environmental exposure.

In another aspect of the present disclosure, which may be used in combination with any other aspect or combination of aspects listed herein, the environmental indicator material has a first color which is a white or light color. The substrate has a second color darker than the first color so that a color contrast is detectable by naked eye under normal lighting conditions between the first color and the second color. Additionally, the environmental monitor changes color after the predetermined environmental exposure.

In another aspect of the present disclosure, which may be used in combination with any other aspect or combination of aspects listed herein, the environmental monitor further includes a reference component supported by the substrate in a layered configuration as a reference layer having a reference ring with an opaque color and a viewing window being transparent or a hole. The reference layer is positioned over the first layer, and the reference ring has a third color similar in color or hue to the second color of the substrate or darker in appearance that the second color of the substrate. The substrate is viewable through the viewing window of the reference layer after the predetermined environmental exposure.

In another aspect of the present disclosure, which may be used in combination with any other aspect or combination of aspects listed herein, the environmental indicator material is transparent in its initial color state and is located over the security material, so that the security material is viewable through the environmental indicator material in its initial color state, and obscured once the environmental indicator material irreversibly changes its color state to be opaque after the predetermined environmental exposure. The environmental indicator material is supported by the substrate in a layer configuration as a first layer, and the security material is supported by the substrate in a layer configuration as a second layer positioned between the first layer and the substrate.

In another aspect of the present disclosure, which may be used in combination with any other aspect or combination of aspects listed herein, the environmental indicator material, after the predetermined environmental exposure, has a first color. Additionally, the substrate has a second color, and the first color and the second color are the same or similar so that no color contrast is detectable by naked eye under normal lighting conditions between the first color and the second color. Additionally, the environmental monitor does not change apparent color to the naked eye in normal lighting conditions after the predetermined environmental exposure.

In another aspect of the present disclosure, which may be used in combination with any other aspect or combination of aspects listed herein, the environmental indicator material, after the predetermined environmental exposure, has a first color, and the substrate has a second color. The first color is different from the second color so that a color contrast is detectable by naked eye under normal lighting conditions between the first color and the second color, and the environmental monitor changes color after the predetermined environmental exposure.

In another aspect of the present disclosure, which may be used in combination with any other aspect or combination of aspects listed herein, the security material is a luminescent material, and the environmental monitor is configured so that the luminescent material is always viewable and gives the bright appearance of the predetermined color when exposed to the specific light wavelengths, regardless of the color state of the environmental indicator material, but is undetectable by naked eye under normal lighting conditions.

In another aspect of the present disclosure, which may be used in combination with any other aspect or combination of aspects listed herein, the environmental monitor further includes a reference component supported by the substrate in a layered configuration as a reference layer having a reference ring, and wherein the security material is positioned within the reference ring.

In another aspect of the present disclosure, which may be used in combination with any other aspect or combination of aspects listed herein, the security material comprises a material selected from the group consisting of: a phosphorescent material, a fluorescent material, a phosphorescent ink, a fluorescent ink, a phosphorescent dye, a fluorescent dye, a photochromic material, an irreversibly photochromic material, a photochromic ink, a photochromic dye, an infrared-reflecting material, an ultraviolet-reflecting material, an infrared-absorbing material, an ultraviolet-absorbing material, an optically refractive material, an optically diffractive material, a holographic material, Strontium Aluminate, CaS, ZnS, Sift, Green Phosphorescent Pigment Powder, Red ZnS Phosphorescent Pigment Powder, Red CaS Phosphorescent Pigment Powder, and combinations thereof.

In another aspect of the present disclosure, which may be used in combination with any other aspect or combination of aspects listed herein, the environmental indicator material includes the luminescent material which appears faintly colored, colorless or transparent under normal lighting conditions and gives a bright appearance of a predetermined color when exposed to the specific light wavelengths. Additionally, the luminescent material continues to give the bright appearance of the predetermined color for at least a predetermined interval after cessation of exposure to the specific light wavelengths.

In another aspect of the present disclosure, which may be used in combination with any other aspect or combination of aspects listed herein, the at least a predetermined interval is in the range of about 0.1-60 seconds.

In another aspect of the present disclosure, which may be used in combination with any other aspect or combination of aspects listed herein, the at least a predetermined interval is in the range of about 1-15 seconds.

In another aspect of the present disclosure, which may be used in combination with any other aspect or combination of aspects listed herein, the environmental indicator material includes the luminescent material which appears colored with a first color under normal lighting conditions and gives a bright appearance of a second predetermined color when exposed to the specific light wavelengths. The luminescent material continues to give the bright appearance of the second predetermined color for at least a predetermined interval after cessation of exposure to the specific light wavelengths.

In another aspect of the present disclosure, which may be used in combination with any other aspect or combination of aspects listed herein, the first color is one of pink, red, purple, blue, yellow or green.

In another aspect of the present disclosure, which may be used in combination with any other aspect or combination of aspects listed herein, the change of color state of the photochromic material is selected from the group consisting of a change in reflectivity, a change in transparency, a change in hue, a change in apparent color, a change in color intensity, a change in brightness and combinations thereof when exposed to the specific light wavelengths.

In another aspect of the present disclosure, which may be used in combination with any other aspect or combination of aspects listed herein, the security material includes the photochromic material comprising at least one component selected from the group consisting of an organic metal compound including triarylmethanes, stilbenes, azastilbenes, nitrones, fulgides, spiropyrans, naphthopyrans, spirooxazines, quinones, photochromic quinones, phenoxynaphthacene quinone, qiarylethenes, azobenzenes, and dithizonates of metals; an inorganic photochromic compound including silver chloride, silver halides, zinc halides, yttrium oxyhydride, silicate photochromic glasses containing silver halide microcrystals including AgBr or AgCl, activated crystals of alkali metal-halide compounds including KCl, KBr or NaF, and doped salts or oxides of alkaline-earth metals including $CaF_2$/La, Ce or $SrTiO_3$/Fe+Mo; a photochromic coordination compound including a sodium nitroprusside compound or a ruthenium sulfoxide compound; and combinations thereof.

Aspects of the subject matter described herein may be useful alone or in combination with one or more other aspects described herein. In an aspect of the present disclosure, an environmental exposure indicator includes a substrate and an environmental indicator material supported by the substrate being opaque in an initial color state and configured to change its color state to transparent responsive to a predetermined environmental exposure other than light exposure. The environmental exposure indicator also includes a background supported by the substrate and beneath the environmental indicator material. The background has an apparent color to the naked eye under normal lighting conditions that is the same or similar as the apparent color of the environmental indicator material in its initial color state, so that under normal lighting conditions, the change of color state of the environmental indicator material is not apparent to the naked eye under normal lighting conditions. Additionally, the environmental exposure indicator includes a security material supported by the substrate and beneath the environmental indicator material, the security material being either a photochromic material configured to change its color state when exposed to specific light wavelengths or a luminescent material configured to give a bright appearance of a predetermined color when exposed to the specific light wavelengths.

In another aspect of the present disclosure, which may be used in combination with any other aspect or combination of aspects listed herein, the environmental indicator material is a first environmental indicator material, and the environmental exposure indicator further includes a second environmental indicator material configured to change its color state responsive to a second predetermined environmental exposure other than light exposure, so the change in color state of the second environmental indicator material is visible to the naked eye under normal lighting conditions.

In another aspect of the present disclosure, which may be used in combination with any other aspect or combination of aspects listed herein, the background includes the second environmental exposure material.

In another aspect of the present disclosure, which may be used in combination with any other aspect or combination of aspects listed herein, the first and second environmental indicator materials both respond to the same type of environmental exposure, and the second environmental indicator material is less sensitive than the first environmental indicator material.

In another aspect of the present disclosure, which may be used in combination with any other aspect or combination of aspects listed herein, the first and second environmental indicator materials are responsive to peak heat exposure, and the first environmental indicator material changes color state at a lower temperature than the second environmental exposure indicator material.

In another aspect of the present disclosure, which may be used in combination with any other aspect or combination of aspects listed herein, the first and second environmental indicator materials are responsive to cumulative heat exposure.

In another aspect of the present disclosure, which may be used in combination with any other aspect or combination of aspects listed herein, one of the first and second environmental indicator materials is responsive to peak temperature exposure and the other is responsive to cumulative heat exposure.

These and other features are disclosed in greater detail in the accompanying figures and the Detailed Description below.

BRIEF DESCRIPTION OF THE DRAWINGS

Some embodiments of the present disclosure, and ways of making and of using one or more embodiments of the present disclosure, are described in detail herein and by way of example, with reference to the several views of the accompanying drawing (which are not necessarily drawn to scale with regard to any internal or external structures shown) and in which like reference characters designate like elements throughout the several views, and in which.

DETAILED DESCRIPTION

Figure 1:
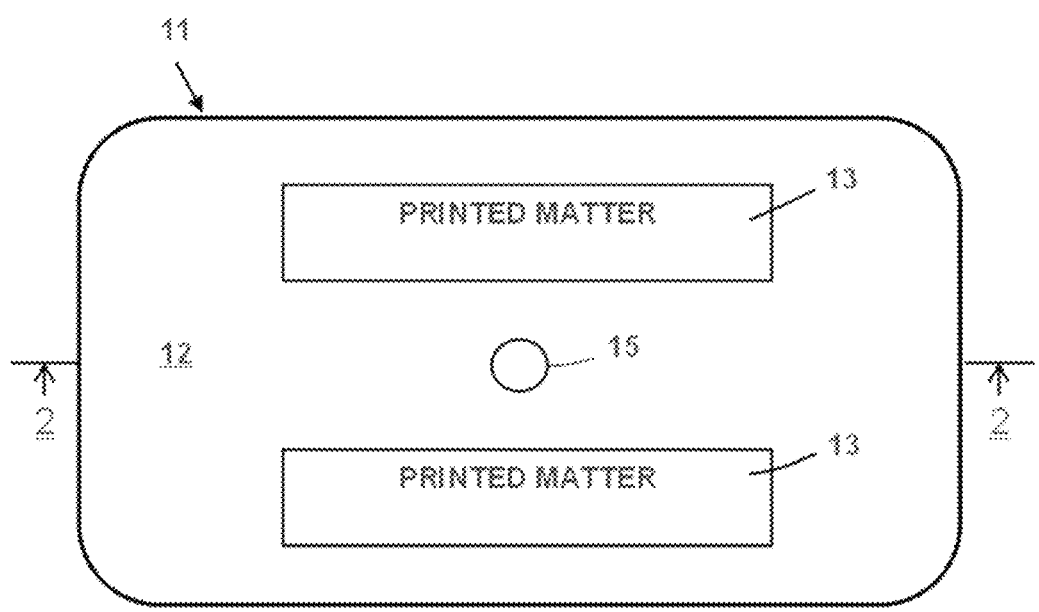
FIG. 1 is a plan view of one embodiment of a historical temperature exposure monitor according to the present disclosure.

A need exists for an environmental monitor that may monitor one or more modes of environmental exposure, such as cumulative ambient heat exposure and peak ambient heat exposure, and which has enhanced properties and/or new properties. The present disclosure is generally directed to environmental monitors provided with luminescent (e.g., phosphorescent or fluorescent) and/or photochromic elements, which may be used (a) to provide environmental exposure information not visible or detectable to the naked eye under normal lighting conditions, (b) to provide anti-counterfeiting protection, and/or (c) for other purposes. As used herein, the "naked eye" means a person's vision or what can be seen without the help of equipment, such as a telescope, microscope prism, filter, camera and the like.

Certain molecules may emit light in a process known as luminescence. When luminescent molecules are exposed to light (photons) of an appropriate wavelength, an electron of the molecule absorbs energy of the photon and moves to a higher orbit. When the electron returns to a lower orbit it emits light. Luminescent materials are comprised of luminescent molecules that are activated by activation light having an activation wavelength and emit emission light having an emission wavelength. Generally, in fluorescent materials the electron does not change its direction of spin and returns to a singlet excited state almost immediately, while in phosphorescent materials (phosphors) the electron transitions to an excited triplet state and takes somewhat longer to return to the low energy state. Fluorescent materials or phosphorescent materials may emit light at a lower energy than the absorbed photon, so either type of luminescent material would emit light (photons) with an emission wavelength longer than the activation wavelength. Generally, the emission wavelength of a phosphorescent material is longer than the emission wavelength of a fluorescent material.

Luminescent materials may be activated with a light source of an appropriate activation wavelength. Emission light from the luminescent material may be detected with a sensor configured to receive light of an appropriate emission wavelength. The time interval from the moment the light source is exposed to the luminescing material until the sensor can no longer detect emission light from the luminescing material is called the radiation period. As used herein, "activated" or in the activated state may be when the security material has receives light of sufficient intensity at an appropriate wavelength. Additionally, "activated" may be when the security material has received sufficient light to begin to luminesce.

Visible color(s) generally refers to the portion of the electromagnetic spectrum that is visible to a human eye, typically comprised of light (photons) with wavelengths from 380 to 740 nanometers. White describes a mixture of these colors, while black describes the absence of these colors. Infrared light, the portion of the electromagnetic spectrum with wavelengths longer than this range, is typically not visible to humans. Ultraviolet light, a portion of the electromagnetic spectrum with wavelengths shorter than this range, are also not typically visible to humans, e.g., invisible to the naked eye. The human eye senses color from a mixture of light (photons) of various wavelengths and intensities. For instance, orange light (600 nm wavelength photons) may be seen as orange, or a mixture of red light (700 nm wavelength photons) and yellow light (570 nm wavelength photons) may be seen as orange. Red light of high intensity mixed with yellow light of low intensity may be seen as red, orange, or vermillion based on the relative intensities. An absence of light may be seen as black, while a combination of infrared and ultraviolet light may be also be seen as black since the received light (photons) in the visible range are of low intensity.

Environmental monitors may be configured as labels that are provided (e.g., printed) on a substrate that has fluorescing properties. For example, the environmental monitors disclosed herein may be printed on a paper substrate that has fluorescing properties such that there is a high contrast between the darker elements of the monitor and the lighter portions of the substrate. It should be appreciated that the fluorescing properties of the substrate, such as a paper with fluorescing properties to provide excellent contrast and print quality, are separate from the luminescent properties (or more particularly, phosphorescent properties of fluorescent properties) exhibited by the components of the environmental monitors disclosed herein.

The present disclosure includes an environmental monitor for monitoring a predetermined environmental exposure, e.g., a predetermined heat exposure such as a predetermined cumulative ambient heat exposure and/or a predetermined peak ambient heat exposure, and for other purposes such as securely monitoring the authenticity of the environmental monitor for anti-counterfeiting protection. The environmental monitors may utilize a security material such as a luminescent material (e.g., a phosphorescent material or a fluorescent material), a phosphorescent material and/or a photochromic material to provide an indication, which may be a reversible indication, a semi-reversible indicator or an irreversible indication, of the one or more modes of the predetermined environmental exposure. The security material may also be utilized as an anti-counterfeiting indicator or part of an anti-counterfeiting indicator to provide authentication of the environmental monitor and/or a host product that the environmental monitor is associated thereby enhancing security of the product and/or the environmental indicator. In certain configurations, the security material may also be used to provide an environmental monitor that provides an indication of environmental exposure that is only detectable after exposure to different external radiation or irradiation sources (e.g., different excitation wavelengths) or different environmental conditions such as the specific light wavelengths, and in some cases, even after such exposure, not detectable to the naked human eye. This feature may be applied to some or all of the indications provided by the environmental monitor, or may be used to provide an entire environmental monitor that is completely invisible to the naked eye under normal lighting conditions.

The environmental monitor may be responsive to a predetermined environmental exposure, for example, a predetermined heat exposure such as predetermined cumulative ambient heat exposure and/or a predetermined peak ambient temperature exposure, a predetermined radiation exposure, a predetermined humidity exposure, a predetermined oxygen exposure, a predetermined freeze exposure, a predetermined thaw exposure, the presence of particular chemicals or biological substances, toxins, or other forms of environmental exposure. It will be appreciated that combination indicators with multiple types of indicators may also be provided.

Security Materials

The various examples presented in the present disclosure may employ security indicators that respond to illumination at particular light wavelengths, or activation wavelengths, including security materials that are luminescent, including either fluorescent or phosphorescent materials, which have a temporary bright appearance when exposed to certain light wavelengths, or that are photochromic, changing color when exposed to certain light wavelengths, either temporarily, or permanently, or that reflect or absorb certain light wavelengths so as to vary their appearance when illuminated by such wavelengths. As used herein, the security indicators may include a material that is provided as a luminescent material or compound (such as a phosphorescent compound or fluorescent compound), a photochromic compound, an ink, a toner, a dye, a paint or a wax with luminescent or photochromic pigments, or a material that reflects or absorbs certain light wavelengths, which each may be generally referred to as a "security material". It will be appreciated that these materials may be chosen to respond to particular predetermined light wavelengths, e.g., specific UV wavelengths, specific IR wavelengths, or other ranges of wavelengths. Different types of security materials may be combined in a single security indicator, or even blended together in a single material, so that it responds differently to different activation wavelengths.

Suitable security material may include a luminescent material or compound (e.g., a phosphorescent compound or a fluorescent compound), or a photochromic material or compound. Fluorescent materials emit light while being illuminated with light of a particular wavelength. Phosphorescent materials continue to emit light after the illumination at the particular activation wavelength is discontinued for a period of time; usually the brightness of the phosphorescent material decays gradually at a rate dependent on the particular material. Photochromic materials change their actual or apparent color when illuminated with light of particular wavelengths. The various security materials may be formulated as an ink, dye, wax, paint, toner, coating, or in other forms. Often such materials are available as pigment powders. The security material may be opaque, semi-opaque or translucent, or transparent in its initial state, prior to being illuminated with the appropriate light wavelength.

Security Material Activation

The security material, may be activated using an irradiation source or a light source emitting light of an appropriate wavelength, e.g., a camera flash (such as a UV or other special wavelength flash), a UV or other special wavelength light source, such as a laser or led, which may be included in handheld scanning device or other reading device, UV or other special wavelength flashlight, or other irradiation source with a suitable wavelength. The security material may have a specific activation or excitation wavelength or wavelength range. In some cases, these cause the security material to luminesce, in other cases the security material may have a chemistry that is configured, responsive to illumination by ultraviolet light of an excitation wavelength(s) of the security material, to undergo a chemical or physical state change between an initial state and an end state, causing a change in the color state of the security material.

After activation, the security material may be read at a specific light wavelength. In some cases these wavelengths may be in the visible spectrum; in other cases they may be outside the visible spectrum and may need to be captured by a scanner, e.g., a UV or IR scanner, while being invisible/undetectable under normal lighting conditions, possibly even in an activated state. The security material may be activated by exposing to an external light source (e.g., UV lights or a special camera flash or scanner light source of an appropriate wavelength) for a brief activation time.

Depending on the type of security indicator desired for a particular application, the security material may be chosen so that it is visible or invisible to the naked eye prior to being illuminated with the specific light wavelengths. For example, a luminescent material may be used that is transparent in its pre-activated state, or is the same apparent color as a surrounding background. Similarly a photochromic material may, in its initial color state be transparent, or the same color as a surrounding background so that the material appears invisible. Similarly, the security material may be chosen so that the bright appearance (in a luminescent indicator material) or a changed color state (in a photochromic indicator) may be either visible or invisible to the naked eye after being activated with the specific light wavelengths.

In some example embodiments, the specific light wavelengths are in a range selected from the group consisting of about 10-400 nm, about 10-380 nm, about 10-100 nm, about 100-280 nm, about 280-315 nm, about 315-400 nm, about 180-380 nm, about 180-400 nm, about 100-400 nm, about 100-315 nm, about 280-400 nm, about 400-500 nm, about 700 nm-1 mm, about 700 nm-1.1 µm, about 780 nm-1.4 µm, about 1.4-3 µm, and about 3 µm-1 mm. For example, the specific light wavelengths may be ultraviolet (UV) lights or infrared (IR) lights. It will be appreciated that different materials may be employed in combination, so that the security material is responsive to different wavelengths in different ways, or so that the increase in fluorescence or decay of phosphorescence when illumination ceases has a desired rate.

The change in color state of the security material may occur for an interval or finite duration after excitation by a light source ceases. The interval or finite duration after excitation by a light source ceases may be in the range of about 0.01 second to about 30 minutes, about 0.01-10 minutes, about 0.1-60 seconds, about 0.1-30 seconds, about 0.5-20 seconds, or about 1-15 seconds. The color change or brightness may decay over time. Different materials may be mixed to produce different profiles of decay of the brightness or color change over time.

The security material may have a particle size of about 100 nm to about 1000 µm, such as about 100 nm to about 500 µm, about 500 nm to about 100 µm, about 500 nm to about 50 µm, about 500 nm to about 10 µm, about 500 nm to about 5 µm, about 500 nm to about 1 µm, about 1 µm to about 2 µm, about 2 µm to about 3 µm, about 3 µm to about 4 µm, about 4 µm to about 5 µm, about 1 µm to about 15 µm, about 10 µm to about 40 µm, about 1 µm to about 1000 µm, about 10 μm to about 500 μm, about 20 μm to about 200 μm, about 25 μm to about 100 μm, about 30 μm to about 50 μm, about 35 μm to about 40 μm, or about 40 μm. Typically, a photochromic security material may have a particle size of less than 10 μm, a phosphorescent security material may have a particle size between 10 μm and 85 μm, and a fluorescent-UV security material may have a particle size between 3 μm and 7 μm. However, in some instances, the phosphorescent security material may have particle sizes less than 2 μm or up to 160 μm. Additionally, in some instances, the fluorescent-UV security material may have particle sizes as small as 500 nm and as large as 15 μm.

The characteristic or property changes of the security material may be a state or value related to color, average color, luminescence or average luminescence (e.g., phosphorescence, average phosphorescence, fluorescence, and average fluorescence), emission value, average emission value, absorption value, or average absorption value. A luminescence value may be an intensity value, an emission wavelength (λ) value, a decay value, an absorption value or a value associated with the spectral signature of the luminescence. The luminescence (e.g., phosphorescence) decay value may be from non-radiative decay through vibrational relaxation or from radiative decay where energy is emitted as electromagnetic radiation or photons. For example, different phosphors lead to different color and spectral emissions. The change in state of the security material may occur for an interval or finite duration after excitation by a radiation or irradiation source ceases.

Characteristics or properties of the security material may be based on an instantaneous value or an average value of one or more of the following properties: color, luminescence (e.g., phosphorescence or fluorescence), emission, absorption, intensity, reflectance, color density, and RGB value. In a specific example, a property of the security material may be based on an increase, rate on increase, decrease or a rate of decrease of the security material's luminescence between a first and second time. The rates may be constant rates or variable rates.

Luminescent Security Materials

In some examples a luminescent material may be used as or as part of the security material. The luminescent material may be either fluorescent or phosphorescent. For example the luminescent material may include a phosphorescent component such as, Luminova Green Phosphorescent Pigment Powder, Red ZnS Phosphorescent Pigment Powder, Red CaS Phosphorescent Pigment Powder, Strontium Aluminate, CaS, ZnS, and combination thereof. Additionally, the luminescent material may include activators or dopants, such as Eu, Dy and Cu. For example, Eu and Dy may be used to form a co-doped strontium oxide aluminate. The luminescent or phosphorescent materials may be organic phosphors or inorganic phosphors that include the activators or dopants. Inorganic phosphors may consist of a host material (e.g., an oxide, nitride, oxynitride, silicate, sulfide, selenide, halide or oxyhalide) doped with small amounts of activator ions (e.g., rare-earth ions and/or transition metal ions). Materials that are capable of producing phosphorescence often contain zinc sulfide, sodium fluorescein, rhodamine, or strontium.

Some examples from TechnoGlow include calcium sulfide (bright red), strontium aluminate euporium dysprosium (invisible-green, invisible-aqua, invisible-blue), yttirium oxide (invisible-red, invisible-orange), zinc sulfide (invisible-green, invisible-orange, invisible-yellow). Other examples from UMC Luminova include strontium aluminate euporium dysprosium (green, blue-green pigment powder) and ZnS:Cu pigment powder (green, yellow, orange, rose, blue) with emission peaks at 520 nm, 529 nm, and 570 nm. Additionally, examples from MaxMax include photoluminescent phosphors (blue-green afterglow) with an emission peak at 498 nm, (sky blue afterglow) with an emission peak at 474 nm, (orange-red afterglow) with an emission peak at 627 nm, (purple afterglow) with an emission peak at 627 nm, (white afterglow) with an emission peak at 497 nm, and (yellow-green afterglow) with an emission peak at 515 nm. Other Examples from iSuo Chem Color include strontium aluminate euporium dysprosium (orange, green, blue-green, purple, sky blue) and ZnS (red).

The luminescent material may also be provided as a commercially available ink, pigment or dye, such as a UV ink, e.g., Opticz Green Lumi-UV Ink, a Direct Glow Red UV Ink, and combinations thereof. Some example commercially available luminescent security materials include:

a. MaxMax UV inks, which may be solvent based inks, water based ink, or UV powders that are either water or solvent soluble. The MaxMax UV solvent based inks may luminesce in various colors including blue, purple, pink, red and yellow. Additionally, the MaxMax UV water based inks may luminesce in various colors, such as blue. Other examples include UV powders that are either water or solvent soluble and that luminesce in various colors such as blue, green or red.

b. Direct Glow inks including Opticz Invisible blue IV ink, Opticz Green Lumi-UV ink, Opticz Pink Lumi-UV ink, Opticz Yellow Lumi-UV ink, Bright Red UV ink, and Bright Green UV ink.

c. Technoglow inks including Invisible-Violet UV glow, Invisible-Red UV glow, Green Glow, Aqua Glow, White Glow and Blue Glow.

d. Hitachi luminescent material called JP-F92 Invisible blue ink.

e. Risk Reactor inks including IF2-CO Clear UV Blue, IF2-C7 Clear UV Red, and IFP Clear Black Fluorescent ink.

f. Luminochem pigments and powders including UV pigment powders that are Green-Blue (LUGB, LUGBZ 360 nm-488 nm), Green (LUCG2 340 nm-495 nm), and Yellow-Green (LUCYG, LUNSAB2 365 nm-529 nm).

g. Rutland Plastics inks, such as NPT Blacklight Clear (ES0620) that once exposed to UV light, luminesces to a blue whitish glow.

h. Magna Colors UV Reactive Invisible ink.

i. Smarol Technology pigments including UV Fluorescent pigment (365 nm, 254 nm) that fluoresce in red, violet, green-yellow, yellow, blue, blue-green, orange.

Typical particle sizes for luminescent materials may be as follows. Strontium Aluminate may have a particle size of about 0.1 μm to about 100 μm, such as about 1 μm to about 40 μm, or about 1 μm to about 15 μm. The CaS may have a particle size of about 0.1 μm to about 100 μm, such as about 1 μm to about 50 μm, about 10 μm to about 40 μm, or about 35 μm. The ZnS may have a particle size of about 0.1 μm to about 100 μm, such as about 1 μm to about 50 μm, or about 10 μm to about 45 μm. The Sift has a particle size of about 0.1 μm to about 100 μm, such as about 1 μm to about 60 μm, or about 30 μm to about 50 μm.

In some example embodiments, the luminescent material may appear colorless, the same color as the surrounding background, or transparent under normal lighting conditions and is configured to give the bright appearance of the predetermined color when exposed to the specific light wavelengths, and the bright appearance of the predetermined color remains for at least a predetermined interval even after cessation of illumination with the specific light wavelengths (phosphorescence). In other examples, the luminescent material may exhibit some residual color and may appear lightly or faintly colored under normal lighting conditions. For example, the predetermined interval may be in the range of about 0.01 second to about 30 minutes, about 0.01-10 minutes, about 0.1-60 seconds, about 0.1-30 seconds, about 0.5-20 seconds, or about 1-15 seconds. The material may also be chosen or tuned so that it decays below a particular brightness threshold within a certain time period, e.g., the bright appearance has less than a certain brightness within 1 second after the illumination ceases. It will be appreciated that the phosphorescent material may be tuned, e.g., by choosing specific material variants, or by mixing various materials together to produce a different response profile.

Optionally, the luminescent material may be chosen so that it does not give any bright color in the visible spectrum and thus is invisible/undetectable by the naked eye even after being activated. In its pre-activated state, prior to illumination, the luminescent material may be opaque, e.g., in a white or light color, semi-opaque, transparent, or translucent. A luminescent indicator may be made invisible to the naked eye in its pre-activated state, by having it be transparent, or by having its color match the surrounding background.

Photochromic Security Materials

In some example embodiments the photochromic material is configured to change its color state when exposed to certain specific light wavelengths, and the change of color state of the photochromic material may include a change of reflectivity, a change in transparency, a change in hue, a change in apparent color, a change in color intensity, a change in brightness or combinations thereof. While most photochromic materials generally do not emit significant amounts of light when activated, some photochromic materials may be both photochromic and luminescent, e.g., by mixing two pigments with different properties.

In some example embodiments where the security material includes the photochromic material, the material may include an organic metal compound including triarylmethanes, stilbenes, azastilbenes, nitrones, fulgides, spiropyrans, naphthopyrans, spiro-oxazines, quinones, photochromic quinones, phenoxynaphthacene quinone, diarylethenes, azobenzenes, and dithizonates of metals; an inorganic photochromic compound including silver chloride, silver halides, zinc halides, yttrium oxyhydride, silicate photochromic glasses containing silver halide microcrystals including AgBr or AgCl, activated crystals of alkali metal-halide compounds including KCl, KBr or NaF, and doped salts or oxides of alkaline-earth metals including $CaF_2$/La, Ce or $SrTiO_3$/Fe+Mo; a photochromic coordination compound including a sodium nitroprusside compound or a ruthenium sulfoxide compound; and combinations thereof. It will be appreciated that other photochromic materials may also be employed.

A photochromic material may contain a color pigment that appear colorless under normal lighting conditions and changes color (e.g., dark to light, light to dark, white to red, etc.) when exposed to particular light wavelengths, e.g., UV light. After the particular light wavelengths are removed or the photochromic ink is removed from the activating light exposure, the colored pigment continues to appear colored, in some cases permanently, and in some cases for a period of time, for example one day, one hour, or for a shorter time (e.g., a minute or less), such as in the range of about 0.01 second to about 30 minutes, about 0.01-10 minutes, about 0.1-60 seconds, about 0.1-30 seconds, about 0.5-20 seconds, or about 1-15 seconds. Photochromic material may also change from one color to another color (e.g., a first color to a second color). For example, pigments provided by Solar Color Dust may change from yellow to purple, blue to green, green to red, orange to blue, etc.

Other Security Materials

Additionally, materials containing an inorganic pigment may be configured to reflect a light of specific wavelength, such as a special camera flash, back to an image sensor during image capture, but otherwise appear invisible without an illumination at the correct wavelength. It will be appreciated that other materials, responsive to or reflecting other specific light wavelengths may also be employed, e.g., an infrared-reflecting material, an ultraviolet-reflecting material, an infrared-absorbing material, an ultraviolet-absorbing material, an optically refractive material, an optically diffractive material, a holographic material, etc.

Some commercial examples include materials from (1) Solar Color Dust: Solar Pearls, which are mica-based pearlescent (light reflective) pigments that change color with UV light (e.g., silver to magenta, silver to gold, gold to green, orange to violet, blue to green); (2) Luminochem: Near Infra-Red ("NIR") pigment or dye that appears black or grey with IR camera (e.g., LUWSIR4 dark green powder IR absorbing at wavelengths from 865 nm to 1025 nm, LUNIR5 powder IR absorbing at wavelengths from 800 nm to 1100 nm, LUNIR17 powder IR absorbing at wavelengths from 700 nm to 840 nm); (3) Isuo Chemical, Color reflective glass beads: aluminum-plated high reflective glass beads (materials—$TiO_2$, $SiO_2$, CaO, $Na_2O$, BaO), which appear brightly colored with illumination (silver, white, pink, orange, yellow, green, blue); (4) MaxMax, Camera flash ink and camera flash pigment; (5) MaxMax, IR Inks, which are clear at wavelengths above 800 nm, and change from black (visible) to clear (IR), blue (visible) to clear (IR), magenta (visible) to clear (IR), yellow (visible) to clear (IR), and black (visible) to black (IR); (6) MaxMax, IR ink 1 that changes from invisible to green (IR absorbing at 793 nm, emission at 840 nm) an IR ink 2 that changes from invisible to blue (IR absorbing at 824 nm, emission at 880 nm); and (7) LCR Hallcrest: WB Flasher Ink.

Environmental Monitor with Stationary Indicator

The present disclosure provides an environmental monitor for monitoring a predetermined environmental exposure and for other purposes such anti-counterfeiting protection. The environmental monitor may comprise an environmental indicator material and a security material, which are in a fixed position and generally do not move appreciably responsive to environmental exposure of the type the monitor is intended to detect. The environmental monitor may be configured to attach to a host product for monitoring the predetermined environmental exposure of the host product, and further may serve as an anti-counterfeiting indicator or part of an anti-counterfeiting indicator to provide an indication, which may be a reversible indication or an irreversible indication, of the authenticity of the host product. Some alternative examples may also be used for applications where it is desirable that the state of the environmental monitor not be viewable, under normal lighting conditions, by the naked eye.

The environmental monitor may include an environmental exposure indicator that changes state, e.g., color state, when exposed to a predetermined environmental exposure, for example a particular type of environmental exposure beyond a certain threshold. The environmental exposure indicator may be, e.g., a heat exposure indicator such as a peak heat exposure indicator or a cumulative heat exposure indicator (time-temperature), a radiation exposure indicator, a humidity exposure indicator, an oxygen exposure indicator, a freeze indicator, a thaw indicator, a current temperature indicator, a blood temperature indicator, a pH indicator, etc. The predetermined environmental exposure may b, e.g., e a predetermined radiation exposure, a predetermined humidity exposure, a predetermined oxygen exposure, a predetermined freeze exposure, a predetermined thaw exposure, a predetermined peak heat exposure, a predetermined cumulative heat exposure, and combinations thereof. The environmental indicator may be configured to irreversibly change its color state responsive to the predetermined environmental exposure. As used herein, "the state of the environmental monitor" refers to whether the environmental monitor has experienced the predetermined environmental exposure, causing it produce a different indication. This is generally indicated by a change in the appearance, e.g., the color state, of the environmental indicator material.

The environmental monitor also includes security material somewhere on, in, or near the environmental monitor to help insure the authenticity of authenticity of the environmental monitor or its host product, e.g., for anti-counterfeiting protection. For example, the security indicator can be in a color reference area for the environmental indicator, or in other locations that are not in the same location as an environmental exposure indicator material. In other examples, the security indicator may be located in the same region as the environmental exposure indicator material, in different configurations. The security material may be mixed with, positioned under, or positioned over the environmental indicator material; or may be adjacent or proximate to the environmental indicator material on the substrate, such that the security material is within the environmental indicator material or in an area outside of the environmental indicator material, but near the environmental indicator material. The proximity of the security material to the environmental indicator material or the environmental monitor may be such that the security material is spaced apart from either the environmental indicator material or the environmental monitor. For example, the security material may be spaced approximately half the width of the environmental monitor from an outside edge of the environmental monitor. In some examples, the security material may partially or completely surround the environmental monitor. By providing the security material in a region outside of the environmental monitor, more of the security material may be perceived by a user or read by a reader to determine the properties of the security material. Additionally, since each portion of the security material may be read and utilized for analysis, less security material may be needed for the same measuring accuracy as environmental monitors with overprinted or underprinted security materials, thereby further reducing waste and cost.

The change of color state of the environmental indicator may include a change of reflectivity, a change in transparency, a change in hue, a change in apparent color, and combinations thereof. In an embodiment, the change of the color state of the environmental indicator material is a change of transparency. In another embodiment, the change of the color state of the environmental indicator material is a change of transparency which reveals or hides the security material. In one alternative, the change in color state of the environmental indicator material responsive to the predetermined environmental exposure is not detectable by the naked eye under normal lighting conditions after the predetermined environmental exposure. In such an example, the change of state of the environmental indicator may be read by a imaging device configured to read outside the visible spectrum, and/or by the use of special illumination which causes the environmental indicator (or a security material made visible by a change in the environmental indicator) to become visible.

In an embodiment, the environmental indicator material in its initial color state is opaque and has a first color, the substrate has a second color, the first color and the second color are the same or similar so that no color contrast is detectable by naked eye under normal lighting conditions between the first color and the second color, and when the environmental indicator material has been exposed to the predetermined environmental exposure and changes its color state to be transparent, the substrate and the security material are revealed, and the environmental monitor does not change color detectable by naked eye under normal lighting conditions. In such case, the state of the environmental monitor is only detectable under the specific light wavelengths. The specific light wavelengths may be in various predetermined ranges, e.g., in a range of about 10-400 nm, about 10-380 nm, about 10-100 nm, about 100-280 nm, about 280-315 nm, about 315-400 nm, about 180-380 nm, about 180-400 nm, about 100-400 nm, about 100-315 nm, about 280-400 nm, about 400-500 nm, about 700 nm-1 mm, about 700 nm-1.1 µm, about 780 nm-1.4 µm, about 1.4-3 µm, or about 3 µm-1 mm. In an example, the specific light wavelengths may be ultraviolent (UV) lights or infrared (IR) lights.

The security material may be the luminescent material and the bright appearance of the predetermined color produced by the luminescent material when activated may be in the visible spectrum, or alternatively be invisible/undetectable to the naked eye under normal lighting conditions.

In some examples, the environmental indicator material changes color state responsive to temperature. For example, the predetermined environmental exposure may be a predetermined heat exposure, such as a predetermined cumulative ambient heat exposure and/or a predetermined peak ambient heat exposure. For indicating heat exposure, the environmental indicator material may be a meltable solid which is configured to change color state or opacity (e.g., opaque white to transparent) in response to the melting of the meltable solid at a predetermined temperature, the color state change persisting after the meltable solid re-solidifies. One example of such material is a side-chain crystalline (SCC) polymer having side chain crystallinity. For indicating cumulative heat exposure, SCCs may also be used. Alternatively, the environmental indicator material include an active diacetylenic compound configured to change its color state in response to cumulative heat exposure over time.

In some examples, the environmental indicator material is opaque in its initial color state and is positioned over the security material, so that the security material and the substrate are obscured by the environmental indicator material in its initial color state, and are revealed once the environmental indicator material has been exposed to the predetermined environmental exposure and changes its color state to be transparent.

In an embodiment, the environmental monitor may further comprise a reference component supported by the substrate in a layered configuration as a reference layer having a reference ring with an opaque color and a viewing window being transparent or a hole, the reference layer positioned over the environmental indicator material, the reference ring having a third color similar in color or hue to the second color of the substrate or darker in appearance that the second color of the substrate, and the substrate being viewable through the viewing window of the reference layer after the predetermined environmental exposure. It will be appreciated that other forms of color or other types of optical property reference may also be provided besides reference rings wherever they are discussed in the present disclosure.

In an embodiment, the environmental monitor is configured to change color detectable by naked eye under normal lighting conditions after the predetermined environmental exposure.

In an embodiment, the environmental indicator material in its initial color state has a first color, the substrate has a second color, the first color is different from the second color so that a color contrast can be detected by naked eye under normal lighting conditions between the first and the second colors, when the environmental indicator material has been exposed to the predetermined environmental exposure and changes its color state to be transparent, the substrate and the luminescent material are revealed, and the environmental monitor changes color detectable by naked eye under normal lighting conditions. In this embodiment, the state of the environmental monitor is detectable under both the normal lighting conditions and the specific light wavelengths.

In an embodiment, the first color is white or a light color, and the second color is black or a dark color darker than the first color.

In an embodiment, the environmental monitor may further comprise a reference component supported by the substrate in a layered configuration as a reference layer having a reference ring with an opaque color and a viewing window being transparent or a hole, the reference layer positioned over the environmental indicator material, the substrate having a dark color similar in color or hue to the reference ring or darker in appearance than the reference ring, and the substrate being viewable through the viewing window of the reference layer after the predetermined environmental exposure.

In an embodiment, the environmental indicator material includes a meltable solid and configured to form a first layer, and the security material is mixed with the same meltable solid and configured to form a second layer, the second layer is positioned between the first layer and the substrate, wherein the meltable solid is opaque in its initial color state so that the security material and the substrate are obscured, and the meltable solid melts to irreversibly change its color state from opaque to be transparent responsive to the predetermined heat exposure so to reveal the luminescent material and the substrate.

In an embodiment, the environmental indicator material has a first color which is a white or light color, the substrate has a second color same as or similar to the first color so that no color contrast is detectable by naked eye under normal lighting conditions between the first color and the second color, and the environmental monitor does not change color after the predetermined environmental exposure. In this embodiment, the environmental monitor does not change its color under the normal lighting condition after the predetermined heat exposure; and gives the bright appearance of the predetermined color when exposed to the specific light wavelengths after the predetermined heat exposure.

In an embodiment, the environmental monitor may further comprise a reference component supported by the substrate in a layered configuration as a reference layer having a reference ring with an opaque color and a viewing window being transparent or a hole, the reference layer positioned over the first layer, the reference ring having a third color similar in color or hue to the second color of the substrate or darker in appearance that the second color of the substrate, and the substrate being viewable through the viewing window of the reference layer after the predetermined environmental exposure. In this embodiment, the environmental monitor does not change its color under the normal lighting condition after the predetermined heat exposure and gives the bright appearance of the predetermined color when exposed to the specific light wavelengths after the predetermined heat exposure.

In an embodiment, the environmental indicator material has a first color which is a white or light color, the substrate has a second color darker than the first color so that a color contrast is detectable by naked eye under normal lighting conditions between the first color and the second color, and the environmental monitor changes color after the predetermined environmental exposure. In this embodiment, the environmental monitor changes its color from white or light color to darker color under the normal lighting condition after the predetermined heat exposure; and gives the bright appearance of the predetermined color when exposed to the specific light wavelengths after the predetermined heat exposure.

In an embodiment, the environmental monitor may further comprise a reference component supported by the substrate in a layered configuration as a reference layer having a reference ring with an opaque color and a viewing window being transparent or a hole, the reference layer positioned over the first layer, the reference ring having a third color similar in color or hue to the second color of the substrate or darker in appearance that the second color of the substrate, and the substrate being viewable through the viewing window of the reference layer after the predetermined environmental exposure. In this embodiment, the environmental monitor changes its color under the normal lighting condition after the predetermined heat exposure; and gives the bright appearance of the predetermined color when exposed to the specific light wavelengths after the predetermined heat exposure.

Figure 8:
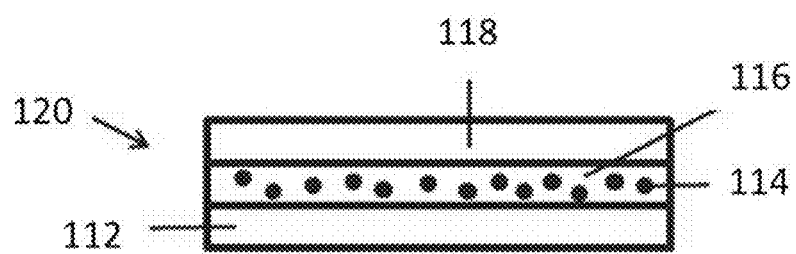
FIG. 8 is a sectional view of a still further embodiment of the environmental monitor according to the present disclosure, in which an environmental indicator material and a security material is mixed to form a single layer and is positioned underneath an additional layer of the environmental indicator material.

Example Environmental Monitor where Security Materials are Revealed by the Environmental Indicator Material Color State Change FIG. 8 illustrates an example of an environmental monitor 120 in sectional view. The security material is represented by the black dots 114 in FIG. 8. Environmental monitor 120 includes a substrate 112. The substrate supports a layer containing security material 114 and a material 116 such as a SCC polymer in this example. Environmental monitor 120 further includes an environmental indicator material 118 which is the same SCC polymer as the material 116 in this example. As shown in FIG. 8, the layer containing security material 114 and the material 116 is positioned between the substrate and the layer containing the environmental indicator material 118. When the SCC polymers in 116 and 118 melts after the predetermined environmental exposure, it reveals the security material 114 which gives a bright appearance of a predetermined color or changes its color state visible/detectable under UV lights while being invisible/undetectable under normal lighting conditions; and further reveals the substrate.

In an embodiment, the substrate 112 can have the same or similar color of the environmental indicator material 118 in its initial state before the predetermined environmental exposure, so that the environmental monitor does not change color to the naked eye under normal lighting conditions after the predetermined environmental exposure. The environmental monitor thus can functional as an invisible environmental monitor to the naked eye under normal lighting conditions. Alternatively, the substrate 112 can have a contrasting color from that of the environmental indicator material 118 in its initial state before the predetermined environmental exposure, so that the environmental monitor changes color detectable by the naked eye under normal lighting conditions after the predetermined environmental exposure. The state of the environmental monitor can be detected under both normal lighting conditions and the specific light wavelengths.

Figure 9:
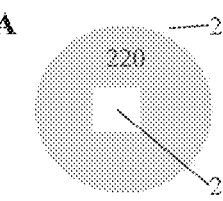
FIG. 9 is a top plan view of a still further of the environmental monitor according to the present disclosure in four different states, before and after the predetermined environmental exposure both under normal lighting conditions and after being activated by specific light wavelengths.
Figure 9:
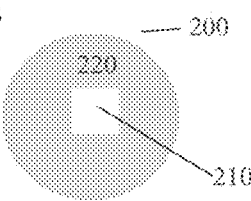
Figure 9:
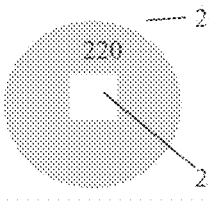
Figure 9:
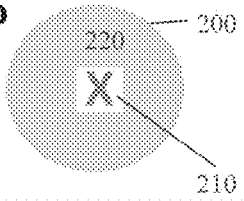

FIG. 9 illustrates an example of an environmental monitor 200 in plan view with an additional reference component over the layer of the environmental indicator material 118 of the same environmental monitor 120 shown in FIG. 8. In this example, the security material 114 (not shown in FIG. 9) is obscured by environmental indicator material 118 in its initial state and revealed when the environmental indicator material 118 has been exposed to the predetermined environmental exposure and changes color state. Environmental monitor 200 has the reference component comprising viewing window 210 and reference ring 220. Environmental monitor 200 is configured to have both the environmental indicator material 118 and the security material 114 positioned in the area underneath the viewing window 210. The environmental indicator material 118 is opaque, e.g., in a white or light color lighter than the color of the reference ring 220 in its initial state as shown in FIGS. 9A and 9B under normal lighting conditions and specific light wavelengths, and is configured to change its color state to be transparent after the predetermined heat exposure so to reveal whatever is behind the environmental indicator material 118, e.g., the security material 114 and the substrate 112. In this case, the security material 114 is provided behind the environmental indicator material 118, and will only be readable when the environmental indicator material 118 becomes transparent after the predetermined environmental exposure. The apparent color of the substrate 112 and the security material 114 is not distinctive from the initial color of the environmental indicator material 118, the environmental monitor 200 does not change apparent color after the predetermined environmental exposure as shown in FIG. 9C. This allows a configuration where the only way to determine that the environmental monitor 200 has changed its state is to illuminate it with the specific light wavelengths (i.e., UV lights in this example), causing the security material 114 to luminesce (i.e., the bright appearance of the predetermined green color in "X" mark in the viewing window 210 in this example), as shown in FIG. 9D. In this way, the state change of the environmental indicator 200 need not be visible to the naked eye under normal lighting conditions, but can be detected using the specific illumination of the security material.

In some embodiments, it is desirable that the state of the environmental monitor is invisible/undetectable to the naked eye under normal lighting conditions, but can be detected under specific light wavelengths. By having the environmental indicator in its initial state, match the color of the substrate and the security material in its pre-activated state, when the environmental indicator become transparent, there will be no apparent change to the naked eye under normal lighting conditions. However, when the security material is activated, it will become detectable under specific light wavelengths. Alternatively, the substrate may have a black or dark color darker than the white or light color of the environmental indicator material in its initial state, so that the viewing window turns from the white or light color before the predetermined environmental exposure to the black or dark color after the predetermined environmental exposure.

In an embodiment, the environmental indicator material is transparent in its initial color state and is located over the security material, so that the security material is viewable through the environmental indicator material in its initial color state, and obscured once the environmental indicator material irreversibly changes its color state to be opaque after the predetermined environmental exposure, wherein the environmental indicator material supported by the substrate in a layer configuration as a first layer, and the security material supported by the substrate in a layer configuration as a second layer positioned between the first layer and the substrate. In this embodiment, the environmental monitor gives the bright appearance of the predetermined color when exposed to the specific light wavelengths before the predetermined heat exposure, and does not give the bright appearance of the predetermined color when exposed to the specific light wavelengths after the predetermined heat exposure.

In an embodiment, the environmental indicator material after the predetermined environmental exposure has a first color, the substrate has a second color, the first color and the second color are the same or similar so that no color contrast is detectable by naked eye under normal lighting conditions between the first color and the second color, and the environmental monitor does not change color after the predetermined environmental exposure. In this embodiment, the environmental monitor gives the bright appearance of the predetermined color when exposed to the specific light wavelengths before the predetermined heat exposure, and does not give the bright appearance of the predetermined color when exposed to the specific light wavelengths after the predetermined heat exposure. The environmental monitor does not change color under normal lighting conditions after the predetermined heat exposure.)

In an embodiment, the environmental indicator material after the predetermined environmental exposure has a first color, the substrate has a second color, the first color is different from the second color so that a color contrast is detectable by naked eye under normal lighting conditions between the first color and the second color, and the environmental monitor changes color after the predetermined environmental exposure. In this embodiment, the environmental monitor gives the bright appearance of the predetermined color when exposed to the specific light wavelengths before the predetermined heat exposure, and does not give the bright appearance of the predetermined color when exposed to the specific light wavelengths after the predetermined heat exposure. The environmental monitor changes color under normal lighting conditions after the predetermined heat exposure.

Figure 10:
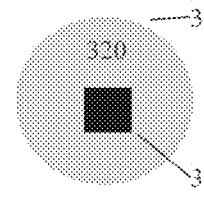
FIG. 10 is a top plan view of a still further of the environmental monitor according to the present disclosure in four different states, before and after the predetermined environmental exposure both under normal lighting conditions and after being activated by specific light wavelengths.
Figure 10:
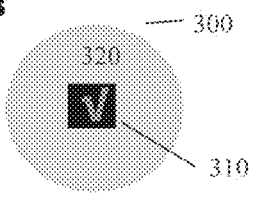
Figure 10:
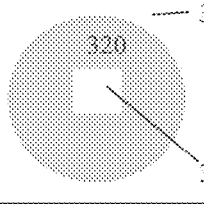
Figure 10:
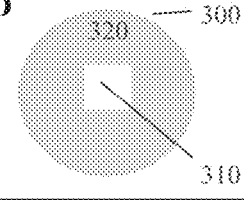

Example Environmental Monitor where Security Materials are Obscured by the Environmental Indicator Material after Color State Change FIG. 10 illustrates an example of environmental monitor 300 in plan view, where the security material is viewable before the predetermined environmental exposure but obscured after the predetermined environmental exposure. Environmental monitor 300 has a reference component comprising a viewing window 310 and a reference ring 320. Environmental monitor 300 is configured to have the environmental indicator material (such as a SCC polymer in this example) positioned over the security material and both in the area underneath the viewing window 310. In this example, the environmental indicator material is transparent in its initial state revealing whatever is behind the environmental indicator material, such as the substrate in black or a dark color and the security material in this example, before the predetermined environmental exposure. The viewing window 310 shows the black or dark color of the substrate under normal conditions as shown in FIG. 10A because the security material does not luminesce under normal conditions; and the viewing window 310 shows the black or dark color of the background with the security material luminescing in the predetermined bright green color shown as a checkmark "Ai" in FIG. 10B. The environmental monitor 300 is further configured for the environmental indicator material to change its color state to be opaque, e.g., opaque white or light color thus obscuring the contrasting black or dark color substrate and the security material after the predetermined environmental exposure, as shown in FIGS. 10C and 10D. In this case, the security indicator material is positioned beneath the environmental indicator, so that it is only detected when illuminated (as shown in a bright green checkmark "Ai" in this example in FIG. 10B) with the specific light wavelength before the environmental exposure occurred. This may be particularly suitable where reading the security material provides the indication that the product is acceptable.

This configuration may also be useful if two different security materials are employed, one which is obscured by the change of color state of the environmental material and one that is not. In this approach, the device may always give off a bright appearance when illuminated at specific light wavelengths, but the responsive illumination might have different colors, and/or different decay properties. The device might always be authenticated with the security materials, regardless of the environmental indicator state. If no ordinary indicator color change occurs, this approach may be used to provide an environmental indicator that can always be authenticated by special illumination, but whose change of state in response to the predetermined environmental exposure is only visible under special illumination.

In some embodiments, the environmental indicator material is adjacent to or proximate to, mixed with, or positioned under the security material to form a mixture supported by the substrate in a layered configured as a mixture layer, so that the security material is always viewable.

In an embodiment, the security material is the luminescent material which gives the bright appearance of the predetermined color when exposed to the specific light wavelengths, regardless of the color state of the environmental indicator material, but is invisible/undetectable by naked eye under normal lighting conditions. In this embodiment, the historical temperature exposure monitor can be used to securely monitor the authenticity of the historical temperature exposure monitor for anti-counterfeiting protection.

In an embodiment, the environmental indicator material is an opaque meltable solid having a first color in its initial state, the security material is mixed with the same meltable solid, the substrate is obscured before the predetermined environmental exposure, the substrate has a second color, the meltable solid melts and changes its color state from opaque to transparent after the predetermined environmental exposure, so that the substrate is revealed after the predetermined environmental exposure.

In an embodiment, the first color and the second color are the same or similar so no color contrast is detectable by naked eye under normal lighting conditions, so that the environmental monitor does not change color after the predetermined environmental exposure. In this embodiment, the environmental monitor can be used for anti-counterfeiting protection.

In an embodiment, the first color is different from the second color, so that a color contrast can be detected by naked eye under normal lighting conditions between the first color and the second color, and the environmental monitor changes color from the first color to the second color after the predetermined environmental exposure which is detectable by naked eye under normal lighting conditions. In this embodiment, the environmental monitor can be used for anti-counterfeiting protection and for monitoring the predetermined environmental exposure.

The environmental indicator material changes its color state in response to a peak temperature in a range of about 20-70° C., and preferably about 30-60° C. Other temperature ranges may be obtained by tuning the chemistry of the indicator material so that the temperature responsiveness of the indicator is similar to the allowed heat exposure of a host product for which the indicator is intended to be used.

The environmental indicator material may be a meltable solid configured to change color or transparency in response to the melting of the meltable solid, the color or transparency change persisting after the meltable solid re-solidifies. The meltable solid may be a side-chain crystalline (SCC) polymer.

In an embodiment, the meltable solid has a melting point below about 80° C., preferably below about 70° C., and more preferably below about 60° C. In an embodiment, the meltable solid has a melting point above about 20° C., preferably above about 20° C., and more preferably above about 30° C. In an embodiment, the meltable solid has a melting point in the range of about 20-70° C., and preferably in the range of about 30-60° C.

The environmental indicator material may be color-changeable in response to a peak temperature in a range of about 20-70° C., and preferably about 30-60° C. The environmental indicator material may be a meltable solid configured to change color or transparency in response to the melting of the meltable solid, the color or transparency change persisting after the meltable solid re-solidifies. In an embodiment, the meltable solid has a melting point below about 70° C., and preferably below 60° C.; and above about 20° C., and preferably about 30° C. In an embodiment, the meltable solid has a melting point in the range of about 20-70° C., and preferably in the range of about 30-60° C.

In a non-limiting example, the environmental indicator material is opaque in its initial state and is located over the security material, the security material is located between the environmental indicator material and the substrate, so that the security material and the substrate are obscured by the environmental indicator material in its initial opaque color state, and are revealed once the environmental indicator material has been exposed to the predetermined environmental exposure and changes its color state to be transparent.

In some embodiment, the environmental monitor is configured to not change color under normal lighting conditions after the predetermined environmental exposure. For example, the security material is a luminescent material. The environmental monitor does not give a bright appearance of a predetermined color when exposed to the specific light wavelengths before the predetermined environmental exposure (because the security material is hidden by the opaque environmental indicator material), and gives the bright appearance of a predetermined color when exposed to the specific light wavelengths after the predetermined environmental exposure. The state of the environmental monitor is thus invisible/undetectable to the naked eye under normal lighting condition, but can be detected under specific light wavelengths. The environmental monitor can thus function as an invisible environmental monitor under normal lighting conditions to the naked eye.

In some embodiments, the environmental indicator material in its initial state has a first color, and the substrate is opaque and has a second color. The first color of the environmental indicator material is the same or similar color as the second color of the substrate without a color contrast detectable by naked eye under normal lighting conditions, so that when the environmental indicator material has been exposed to the predetermined environmental exposure and changes its color state from opaque to transparent, the security material and the substrate are revealed. The environmental monitor thus does not change color after the predetermined environmental exposure since the substrate has the same or similar color as that of the environmental indicator material in its initial state.

In some embodiment, the environmental monitor is configured to change color after the predetermined environmental exposure which is detectable by naked eye under normal lighting conditions. For example, the environmental indicator material has a first color in its initial state and the substrate has a second color. The first color is significantly different from the second color with a color contrast detectable by naked eye under normal lighting conditions, so that when the environmental indicator material has been exposed to the predetermined environmental exposure and changes its color state from opaque to transparent, the security material and the substrate are revealed. The environmental monitor thus changes color from the first color to the second color after the predetermined environmental exposure.

In some embodiments, the environmental indicator material is opaque in its initial state and is located over the security material, and the security material is located between the environmental indicator material and the substrate, so that the security material and the substrate are obscured by the environmental indicator material in its initial color state, and revealed once the environmental indicator material has been exposed to the predetermined environmental exposure and changes its color state to be transparent, wherein the environmental indicator material supported by the substrate in a layer configuration as a first layer, and the security material supported by the substrate in a layer configuration as a second layer positioned between the first layer and the substrate. In this embodiment, the environmental monitor changes color under normal lighting condition after the predetermined environmental exposure.

In some embodiments, the environmental indicator material is transparent in its initial color state and is located over the security material, so that the security material is viewable through the environmental indicator material in its initial color state, and obscured once the environmental indicator material irreversibly changes its color state to be opaque after the predetermined heat exposure, wherein the environmental indicator material supported by the substrate in a layer configuration as a first layer, and the security material supported by the substrate in a layer configuration as a second layer positioned between the first layer and the substrate. In this embodiment, the environmental monitor gives the bright appearance of the predetermined color (luminescent material) or changes its color state (photochromic material) when exposed to the specific light wavelengths before the predetermined heat exposure, and does not give the bright appearance of the predetermined color or change its color state when exposed to the specific light wavelengths after the predetermined heat exposure. The environmental monitor may change color detectable by naked eye under normal lighting conditions after the predetermined heat exposure.

In some examples, the environmental monitor further comprises a reference component supported by the substrate in a layered configuration as a reference layer having a reference ring with an opaque color and a viewing window being transparent or a hole, the reference layer positioned over the mixture layer and the substrate, the substrate having a dark color similar in color or hue to the reference ring or darker in appearance than the reference ring, the opaque color of the reference ring is darker than the white or light color of the environmental indicator material after the predetermined heat exposure, and the substrate being viewable through the viewing window of the reference layer.

In some cases, the environmental indicator material can be, or includes, a meltable solid. The meltable solid appears opaque in the white or light color in its initial color state, and is configured to melt to irreversibly change its color state to be transparent responsive to the predetermined heat exposure. Alternatively, the meltable solid is transparent in its initial color state and is configured to melt to irreversibly change its color state to be opaque responsive to the predetermined heat exposure. In some cases, the meltable solid can be, or includes, a side-chain crystalline (SCC) polymer. Advantageously, the SCC polymer can provide a relatively sharp transition from the solid state to the liquid state. A sharp transition can be useful in correlating the temperature response characteristics of the polymer with those of the host product to facilitate monitoring the temperature exposure of the host product.

The SCC polymer and the security material are present together as a mixture or blend in a single layer. In some cases, the environmental indicator material and the security material is present as a single-layer film supported by the substrate. In some cases, the film has a thickness of less than about 5 mil. (where a mil. is 0.001 inch, ~25.4 microns), such as about 1 mil. to about 4 mil., about 2 mil. to about 3 mil., or about 3 mil. Suitable SCC polymers are described herein above or elsewhere in the present disclosure.

In an embodiment, the environmental monitor further comprises an adhesive layer contacting the substrate on a side opposite the environmental indicator material and the security material; and optionally a release liner positioned against the adhesive layer on a side opposite the substrate.

In another example embodiment, the environmental indicator material is located adjacent to or proximate to, mixed with, or positioned under the security material so that the security material is viewable and gives the bright appearance of the predetermined color or changes its color state when exposed to the specific light wavelengths regardless of the color state of the environmental indicator material.

The environmental indicator material may be mixed with the security material to form a mixture supported by the substrate in a layered configuration as a single mixture layer, so that the security material is detectable when exposed to the specific light wavelengths, regardless of the color state of the environmental indicator material, for providing the authenticity of the environmental monitor for anti-counterfeiting protection, wherein the environmental indicator material is configured to irreversibly change its color state response to the predetermined heat exposure. The change of color state of the environmental indicator material may be a change of reflectivity, a change of transparency, a change of hue, or a change in apparent color.

In an embodiment, the environmental monitor further comprises a reference component supported by the substrate in a layered configuration as a reference layer having a reference ring with an opaque color and a viewing window being transparent or a hole, the reference layer positioned over the mixture layer and the substrate, the substrate having a dark color similar in color or hue to the reference ring or darker in appearance than the reference ring, the opaque color of the reference ring is darker than a white or light color of the environmental indicator material in its initial state, and the substrate being viewable through the viewing window of the reference layer.

In an alternative approach, the security material may be provided on the environmental monitor in a different position than the environmental indicator material. For example, the security material may be provided in a reference location, such as a reference ring. The security material may also surround the environmental indicator material, may be positioned proximate the environmental indicator material, or may be adjacent to the environmental indicator material. In this way, the security material may be conveniently observed and evaluated, either by a human user when exposed to the specific light wavelengths, or by a device configured to evaluate the environmental indicator material, e.g., by capturing an image of the environmental monitor. Particularly if the material is located in a reference area which is already present to provide a color reference for the environmental indicator material, it will be appreciated that the image that needs to be taken of the monitor will not need to be altered when the security material is introduced, because conventional environmental monitor reading would still require imaging or otherwise assessing the reference area.

Example Environmental Monitor with Security Material Always Readable

Figures 11, 12:
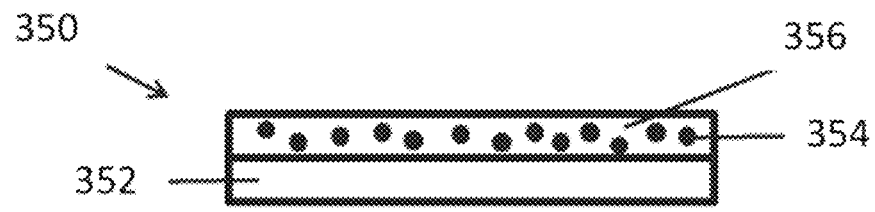
FIG. 11 is a sectional view of a still further embodiment of the environmental monitor according to the present disclosure, in which an environmental indicator material and a security material is mixed to form a single layer.
FIG. 12 is a top plan view of a still further of the environmental monitor according to the present, in four different states, before and after the predetermined environmental exposure under normal lighting conditions and after being activated by specific light wavelengths.

FIG. 11 illustrates an example of an environmental monitor 350 in sectional view. The security material is represented by the black dots 354 in FIG. 11. Environmental monitor 350 includes a substrate 352. The substrate 352 supports a layer containing a mixture of security material 354 mixed with environmental indicator material 356 (a SCC polymer in this example). The SCC polymer is a meltable solid and has a white or light opaque color in its initial state before the predetermined environmental exposure, and changes to be transparent when melts after the predetermined environmental exposure. The SCC polymer maintains transparent when re-solidifies. The substrate 352 has a dark color, which is darker than the white or light color of the environmental indicator material 356 in its initial state before the predetermined environmental exposure. The security material 354 is used to securely monitor the authenticity of the environmental monitor 350 by giving a bright appearance of a predetermined color or changing its color state when exposed to the specific light wavelengths. Other configuration of the environmental monitor is possible. The environmental indicator material may also be provided over the security material, and still allow the same functionality, if the environmental indicator material is sufficiently transparent in all states to always allow the security material to be viewed. Another example configuration of the environmental monitor having the security material always viewable is shown in FIG. 12.

FIG. 12 illustrates an example of an environmental monitor 400 in plan view, with a configuration in which the security material is provided on the reference ring 420 of a reference component of a conventional environmental monitor. Environmental monitor 400 has a reference component including a viewing window 410 where the environmental indicator material (not shown in FIG. 12) is viewable through the viewing window 410 and a reference ring 420 comprising the security material (not shown in FIG. 12). The reference ring 420 is always viewable and the security material on the reference ring 420 always gives a bright appearance of a predetermined color (i.e., the bright green colored halo ring "O" in this example) when exposed to the specific light wavelengths (i.e., UV lights in this example) as shown in FIGS. 12 B and 12D, so that the environmental monitor 400 can be used to authenticate the environmental monitor 400 or a host product that the environmental monitor 400 is associated with for anti-counterfeiting protection. Environmental monitor 400 is further configured for viewing window 410 to be in opaque white or an opaque light color lighter than the color of the reference ring 420 in its initial state before the predetermined environmental exposure as shown in FIG. 12A, and for the viewing window 410 to change color to black or a dark color darker than the color of the reference ring 420 after the predetermined environmental exposure as shown in FIGS. 12C and 12D.

It will be appreciated that this embodiment may be used to help authenticate the environmental monitor for anti-counterfeiting protection and also to monitor the predetermined environmental exposure detectable by naked eye under normal lighting conditions. Other configuration of the environmental monitor is possible. The environmental indicator material may also be provided over the security material, and still allow the same functionality, if the environmental indicator material is sufficiently transparent in all states to always allow the security material to be viewed.

Dual Function Environmental Monitor

In another aspect, the present disclosure provides a dual function environmental monitor for monitoring both a predetermined cumulative ambient heat exposure and a predetermined peak ambient heat exposure, and for other purposes such as securely monitoring the authenticity of the environmental monitor for anti-counterfeiting protection.

Various suitable structure configurations for the dual function environmental monitors are described in U.S. Pat. No. 10,514,340 which is fully incorporated herein by reference for all purposes; these devices may have security materials of the present disclosure added in various advantageous configurations.

In an embodiment, the dual function environmental monitor comprises: a substrate; a cumulative exposure indicator supported by the substrate in a viewable, layered configuration, wherein the cumulative exposure indicator is configured to undergo an optical change in appearance in response to the predetermined cumulative heat exposure under normal lighting conditions; a peak exposure indicator supported by the substrate in the viewable, layered configuration, the peak exposure indicator comprising a meltable solid configured to melt upon exposure to a predetermined peak heat exposure, the meltable solid configured to change color or transparency in response to the melting of the meltable solid, the color or transparency change persisting after the meltable solid re-solidifies; and a colored background under the meltable solid that is dark relative to the meltable solid, wherein the meltable solid is initially opaque, obscuring the background, and is configured to become transparent after melting and to remain transparent after re-solidifying, revealing the background; wherein the cumulative exposure indicator and the peak exposure indicator are functionally separate with the visual outputs of the cumulative exposure indicator and the peak exposure indicator integrated in a single overlapping display.

In an embodiment, the cumulative exposure indicator overlies the peak exposure indicator, and the cumulative exposure indicator comprises a security material, as described previously in this disclosure, configured, regardless of the optical change in appearance of the cumulative exposure indicator under normal lighting conditions, to be viewable and give a bright appearance of a predetermined color or change its color state when exposed to specific light wavelengths while being invisible under normal lighting conditions. This may facilitate to securely monitoring authenticity of the dual function environmental monitor for anti-counterfeiting protection.

In an alternative approach, security material may be position beneath the peak exposure layer, e.g., mixed with proximate or adjacent the cumulative exposure indicator. In this case, the security material might only be readable when both the peak exposure indicator has become transparent and the security indicator has been exposed to the specific wavelengths to activate it.

In an embodiment, the peak exposure indicator is color-changeable in response to melting of the meltable solid. For example, the peak exposure indicator is color-changeable in response to a peak temperature in a range of about 20-70° C., preferably about 30-60° C. The meltable solid may have a melting point in a range of about 20-70° C.

In an embodiment, the dual function environmental monitor further comprises a reference ring which has an appearance that is similar to the appearance of the cumulative exposure indicator that has undergone the optical change in appearance, or alternatively the appearance of the peak exposure indicator. Security material might be provided in the reference ring, generally as an anti-counterfeiting or security measure, because there will be no change in the appearance of security material in the reference ring based on temperature exposure. Security material might also be provided in the reference ring for comparison with security materials provided beneath or as part of the temperature indicator and cumulative exposure layers, in the same manner as the conventional reference ring is used with the temperature indicator materials.

In an embodiment, the cumulative exposure indicator is affected by a temperature that is below a peak temperature of the peak exposure indicator.

In an embodiment, the cumulative exposure indicator darkens in response to the cumulative heat exposure. For example, the cumulative exposure indicator comprises a heat sensing agent, such as a polymerizable diacetylenic compound, that darkens in response to the cumulative heat exposure.

In an embodiment, the melting of the meltable solid reveals a background, the background remaining visible after the meltable solid re-solidifies. In an embodiment, the meltable solid comprises a polymer, such as a SCC polymer. The meltable solid may further comprise an alkane, an alkyl ester, or a wax.

In an embodiment, the peak exposure indicator overlies the cumulative exposure indicator, and the peak exposure indicator comprises a security material configured, regardless of the change of color or transparency of the meltable solid, to be viewable and give a bright appearance of a predetermined color or change its color state when exposed to specific light wavelengths while being invisible under normal lighting conditions to provide authenticity of the dual function environmental monitor for anti-counterfeiting protection.

In an embodiment, the optical change in appearance comprises a reduction in opacity of the cumulative exposure indicator. The optical change in appearance may reveal a background, such as the substrate, thus allowing the background to be read.

Environmental Monitor Based on Positional Displacement

In one aspect, the present disclosure provides an environmental monitor for monitoring a predetermined environmental exposure and for other purposes such as securely monitoring the authenticity of the environmental monitor based on the mechanism of a positional displacement of one or more indicator materials. The indicator materials may include a security material (as described in the previous section), or these indicator materials may move to obscure or reveal the security material. This displacement may be the result of temperature dependent diffusion, the melting of a solid indicator material or its precursor, allowing it to flow, the melting of a meltable solid plug, allowing a liquid to be released, the breaking of a container caused by freezing of its contents, or other approaches. Some specific examples are given below.

In an example embodiment, the environmental monitor is a historical temperature exposure monitor, comprising: a substrate; an optically readable, thermally sensitive moving indicator element supported by the substrate, wherein the moving indicator element comprises an indicator material, preferably a colored material easily visible to the naked eye, configured to move in response to a predetermined temperature exposure; and a security material supported by the substrate and comprising a luminescent material configured to give a bright appearance of a predetermined color when exposed to specific light wavelengths or a photochromic material configured to change color state when exposed to the specific light wavelengths.

The predetermined environmental exposure may be a predetermined freeze exposure, or a predetermined thaw exposure, and preferably a predetermined heat exposure such as a predetermined cumulative ambient heat exposure and/or a predetermined peak ambient heat exposure.

The moving indicator element may be inactive below a base temperature and being thermally responsive at or above an activation temperature to record irreversibly with respect to time cumulative ambient temperature exposure above the activation temperature, the activation temperature being equal to or greater than the base temperature.

The indicator material may be a meltable solid at or below the base temperature in its initial state, and melts to be a viscous liquid at or above a determined temperature and begins to flow. For example, the determined temperature is the activation temperature.

Figure 2:
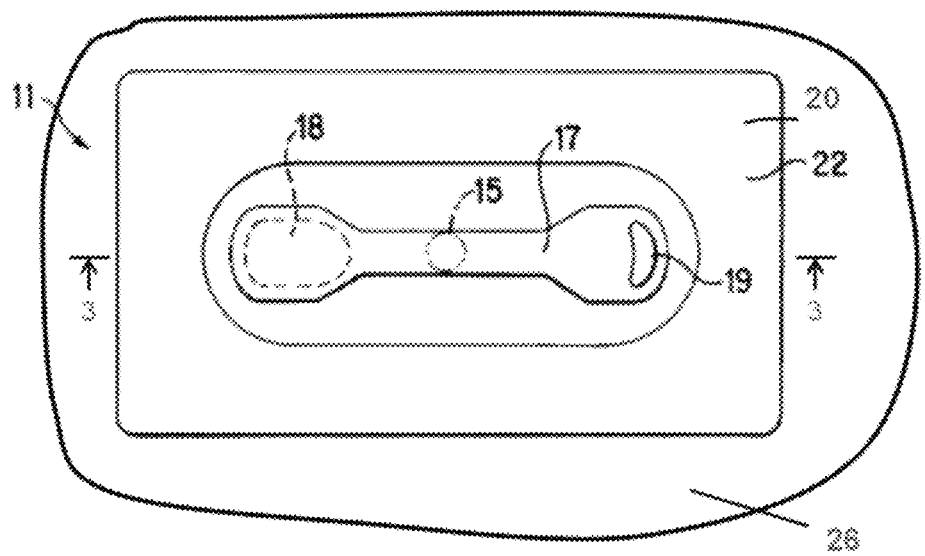
FIG. 2 is a further plan view of the historical temperature exposure monitor shown in FIG. 1 with an upper layer of the historical temperature exposure monitor removed, wherein the historical temperature exposure monitor is shown attached to a host product after removal of a protective liner.
Figure 3:
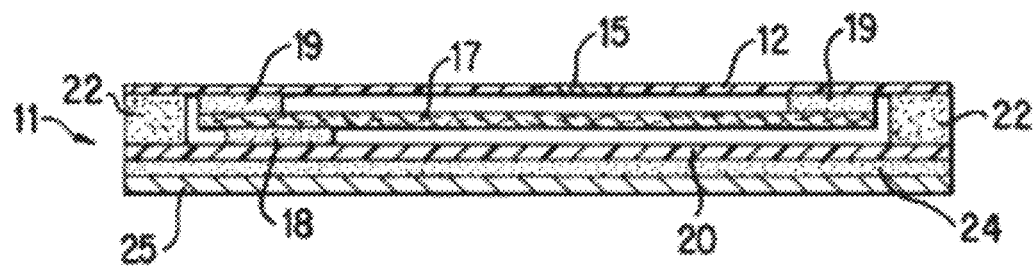
FIG. 3 is a sectional view on the line 3-3 of FIG. 2.

The moving indicator element may comprise a transport member supporting the indicator material as shown in FIGS. 2 and 3, a displacement of the indicator material is a displacement with respect to the transport member, and the displacement of the security material is a displacement with respect to the transport member. The transport member may be absorbent and the indicator material is absorbable by the transport member. The indicator material may comprise the security material in an amount of about 0.01-50 wt. %, in an amount of about 0.1-10 wt. %, in an amount of about 0.1-5 wt. %, in an amount of about 1-10 wt. %, in an amount of about 10-20 wt. %, or in an amount of about 10-40 wt. % of the indicator material.

The indicator material may have a viscosity in the range of about 100-100,000 cP. The viscosity of the indicator material decreases with increasing temperature throughout a temperature range of from about 20° C. to about 70° C., or from about 30° C. to about 60° C. The indicator material may have a viscosity activation energy above 10 kcal/mol. The activation temperature may be in a range of from about −60° C. to about 70° C., from about −20° C. to about 60° C., and preferably from about 10° C. to about 25° C. The activation temperature may exceed the base temperature by a temperature in a range of from about 1° C. to about 50° C. The base temperature may be in a range of from about 0° C. to about 30° C.

The indicator material comprises a synthetic polymer having a molecular weight of at least about 1,000 Da. Preferably, the indicator material comprises a synthetic polymer having side chain crystallinity (SCC). In an example, the transport material is the synthetic polymer having side chain crystallinity (SCC). The indicator material further comprises an alkane, an alkyl ester, a wax or an alkane wax. In an embodiment, the indicator material comprises an undecane, a dodecane, a tridecane, a tetradecane, a pentadecane, a hexadecane, a heptadecane, an octadecane, a nonadecane, an eicosane, a heneicosane, a hexanoic acid, a hexadecane or ethyl lactate. In an embodiment, the wax comprises a paraffin wax, a microcrystalline wax, carnauba wax, beeswax, Chinese wax, shellac wax, spermaceti, tallow, palm wax, soy wax, 15 lanolin, wool grease, a waxy polymer, a waxy copolymer, a polyolefin, polyethylene, polypropylene, an ethylene-vinyl acetate copolymer, an ethylene-acrylic acid copolymer.

The indicator material may comprise a pentadecane and a hexadecane in a ratio of about 10:90 to 90:10, such as about 20:80, about 30:70, about 40:60, about 50:50, about 60:40, about 70:30, or about 80:20. The indicator material may comprise a blend of the synthetic polymer having side chain crystallinity (SCC) and an alkane wax. In an embodiment, the synthetic polymer having side chain crystallinity (SCC) is a solvent-based SCC polymer.

The indicator material may comprise the security material in an amount of about 0.1-50 wt. %, such as about 5-50 wt. %, about 10-40 wt. %, about 15-35 wt. %, about 20-30 wt. %, about 2-15 wt. %, or about 1-10 wt. %, based on the weight of the indicator material.

The security material may be mixed into and is part of the indicator material, so that the security material is displaced with respect to the transport member together with the indicator material, and thus the displacement of the security material is the same as the displacement of the indicator material. Alternatively, the security material is not part of the indicator material and the displacement of the indicator material conceals or reveals the security material.

The historical temperature exposure monitor may be in a round button-like shape. The moving indicator element comprises a ring of indicator material, the transport member comprises a disc-shaped wick, the ring of indicator material extending around the perimeter of the disc-shaped wick, at or near the outer peripheral edge of wick, and the environmental monitor comprises a viewing window disposed approximately centrally of the ring of indicator material wherein the indicator material, when liquid, can flow inwardly of the ring towards the viewing window.

The historical temperature exposure monitor may further comprise an adhesive layer contacting the substrate on a side opposite the environmental indicator material and the security material; and optionally a release liner positioned against the adhesive layer on a side opposite the substrate The historical temperature exposure monitor may include an optically readable, thermally sensitive temperature exposure indicator element. The temperature exposure indicator element can be inactive below a base temperature and can be thermally responsive at or above an activation temperature. Once activated, the environmental monitor can record reversibly or irreversibly, with respect to time, cumulative ambient temperature exposure above the activation temperature. The activation temperature can be equal to or greater than the base temperature.

The temperature exposure indicator element can include an optically detectable indicator material. The thermal response of the indicator element to temperature can be an optically readable positional displacement of the indicator material or another suitable thermal response that provides a reversible, semi-reversible or an irreversible record of ambient temperature exposure. The positional displacement can correlate with the cumulative ambient temperature exposure of the environmental monitor above the activation temperature, optionally with a qualitative, semi-quantitative or quantitative relationship. In an example, the temperature exposure indicator may include (a) an irreversible thermochromic indicator material configured to change color state in response to a temperature above an activation or threshold temperature; (b) a reversible thermochromic indicator material configured to change color state in response to a temperature above the activation or threshold temperature; (c) a reversible thermochromic indicator material configured to change color state in response to a temperature below the activation or threshold temperature; (d) a semi-reversible thermochromic indicator material configured to change color state in response to a temperature above the activation or threshold temperature, and to maintain the changed color state until the temperature falls below a second lower temperature threshold; or (e) an irreversible thermochromic indicator material configured to change color state responsive to cumulative heat exposure over time.

In other examples, the exposure indicator may monitor conditions other than temperature, such as other environmental conditions. For example, the exposure indicator may include an (0 an indicator material configured to change color state responsive to exposure to radiation; (g) an indicator material configured to change color state responsive to exposure to light of a predetermined wavelength; or (h) an indicator material configured to change color state responsive to exposure to humidity.

Examples of such temperature monitors based on the mechanism of the positional displacement of an indicator material are found in U.S. Pat. Nos. 9,546,911 and 8,671,871, which are fully incorporated herein by reference for all purposes.

Some useful indicator materials can provide a positional displacement in response to temperatures above the activation temperature that is progressive, measurable and consistent during a time period of interest.

Suitable indicator materials may include synthetic polymeric materials which are solid below the base temperature and are, or can become, a viscous liquid when at or above the activation temperature. Such synthetic polymeric materials are meltable. Useful synthetic polymers can also be hydrophobic, if desired.

Optionally, a regular dye can be dissolved in such hydrophobic polymers to provide an intense color under normal lighting conditions. An intense color can help provide a strong end point signal with good contrast between an end point condition and a prior condition of the indicator. A historic temperature exposure monitor embodiment of the present disclosure employing such an indicator material can provide a useful alerting signal or warning signal. In one embodiment, the indicator material comprises a regular dye which can provide an intense color under normal lighting conditions without a security material. In another embodiment, the indicator material comprises a security material without a regular dye. In yet another embodiment, the indicator material comprises both a security material and a regular dye.

Examples of such synthetic polymeric material is found in U.S. Pat. Nos. 9,546,911 and 8,671,871, which are fully incorporated herein by reference for all purposes.

The present disclosure provides, inter alia, a historical temperature exposure monitor which employs an optically readable, thermally sensitive indicator element that can be inactive below a base temperature and can be thermally responsive at or above an activation temperature. The activation temperature can be equal to, or higher than, the base temperature. The indicator element can include an optically detectable indicator material.

The historical temperature exposure monitor can have an optical reading direction for a viewer or an optical device to read the state of the historical temperature exposure monitor. The state of the historical temperature exposure monitor can be read by detecting a positional displacement of the indicator material that occurs in response to exposure to a temperature at or above the activation temperature. The positional displacement can be predictable and/or measurable. The positional displacement can relate quantitatively to the cumulative temperature exposure above a threshold temperature, for example, the activation temperature, or another suitable temperature. In some embodiments of the present disclosure, multiple positional displacements of the indicator material of a particular historical temperature exposure monitor that occur at different times as a result of continuing or continual exposure to a temperature or temperatures, above the activation temperature, can be read optically.

The positional displacement can be a flow of liquid indicator material induced by melting of the indicator material in response to temperature change. The positional displacement can take any desired positional form that provides a spatial displacement of some or all of the indicator material that can be read or observed by an optical reading device or a human viewer and detected as a displacement indicative of a change of state of the historical temperature exposure monitor. For example, the positional displacement can be a flow of liquid indicator material. The flow of liquid indicator material can be linear or two-dimensional. The flow can be transverse to the optical reading direction or opposite to the optical reading direction or can proceed in multiple directions. Alternatively, the flow can spread out across an area from a source. For example, the flow can be along an elongated transport member that supports the indicator material. Alternatively the flow can be through a porous material and can occupy a volume presenting a viewing window transverse to the direction of flow.

The indicator material may also include a security material with or without a regular dye and the security material (and the regular dye if present) flows together with the indicator material. The positional displacement of the regular dye is the same as that of the indicator material and can be detected under normal lighting conditions. The positional displacement of the security material is the same as that of the indicator material and can be detected under the specific light wavelengths such as UV lights but is invisible/undetectable to human eyes under normal lighting conditions. The positional displacement of the security material relates quantitatively to the cumulative heat exposure of the historical temperature exposure monitor above a threshold temperature. The historic temperature exposure monitor can therefore function as an invisible temperature monitor to human eyes under normal lighting conditions.

In one example, the historical temperature exposure monitor is configured to allow the security material to be always viewable and to always give a bright appearance of a predetermined color (luminescent material) or change the color state (photochromic material) when exposed to the specific light wavelengths while the security material being invisible/undetectable under normal lighting conditions regardless of the heat exposure. Thus, the historic temperature exposure monitor can be used to indicate the authenticity of the historic temperature exposure monitor or a host product that the historic temperature exposure is associated with for anti-counterfeiting protection.

In a non-limiting example, the indicator material comprising a security material and a regular dye, and the security material and the regular dye both flow together with the indicator material. The positional displacement of the security material and the regular dye is the same as that of the indicator material. The positional displacement of the security material can be detected under the specific light wavelengths and the positional displacement of the regular dye can be detected under normal lighting conditions. While the materials flow together, it will be appreciated, that in an alternative approach, materials diffusing at different rates might also be used.

In a non-limiting example, the historical temperature exposure monitor can include a reservoir of the indicator material. The historical temperature exposure monitor can include a mask to conceal the reservoir of the indicator material and can prevent the indicator material from being read or viewed in the optical reading direction. The mask can be provided by an opaque layer or region of the historic temperature exposure monitor covering the reservoir in a viewing direction. In some embodiment, no mask is present. A transport member can extend away from the reservoir. Optionally, the historic temperature exposure monitor can include a scale to demark progress of the indicator material with respect to the transport member.

In some embodiments of the present disclosure, the indicator material flows in a first direction toward a viewing surface of the historic temperature exposure monitor. The transport member has a first end and a second end in the first direction. The historic temperature exposure monitor comprises a reservoir of the indicator material positioned at the first end of the transport member in the first direction and marks to mark the position of the reservoir in the optical reading direction. The historical temperature exposure monitor does not include a mask to conceal the reservoir of the indicator material to ensure that the viewable surface covers the entire transport member from the first end to the second end of the transport member in the first direction, so that the displacement of the security material in the indicator material is visible along the entire transport member and gives the bright appearance of the predetermined color or changes its color state under the specific light wavelengths while being invisible under normal lighting conditions for monitoring the cumulative ambient temperature exposure and for securely monitoring the authenticity of the historical temperature exposure monitor for anti-counterfeiting protection.

The indicator material can be, or can include, a synthetic polymeric material. The synthetic polymeric material can be solid when at or below the base temperature and can be a viscous liquid when at or above the activation temperature. The viscous liquid can have any of a wide range of viscosities. Such synthetic polymeric material is described in detail in U.S. Pat. Nos. 9,546,911 and 8,671,871, which are fully incorporated herein by reference for all purposes.

The indicator material can be, or can include, an alkane, an alkyl ester, a wax or an alkane wax. The alkane, alkyl ester, wax or alkane wax can be solid when at or below the base temperature and can be a viscous liquid when at or above the activation temperature. The viscous liquid can have any of a wide range of viscosities.

When solid, the synthetic polymeric material can be crystalline or partially crystalline. Crystalline or partially crystalline synthetic polymeric materials can have desirably sharp transitions from a solid state to a liquid state. When in the liquid state, the synthetic polymeric material can transport itself in contact with, on, or through a transport member. Transport of the liquid synthetic polymeric material can be effected by material flow, or in another suitable manner. The transport member can be configured to enable self-transport, or self-flow, of the liquid synthetic polymeric material, for example, by being porous, or wet table by the synthetic polymeric material, or both.

Various structural configurations of historical temperature exposure monitor are described and illustrated in U.S. Pat. Nos. 9,546,911 and 8,671,871, which are fully incorporated herein by reference for all purposes.

An example of one possible construction of a historical temperature exposure monitor embodiment of the present disclosure is shown in FIGS. 1-3 of the accompanying drawings. Other possible constructions will be known or apparent to a person of ordinary skill in the art, in light of this disclosure, or will become known or apparent in the future, as the art develops.

Referring now to FIGS. 1-3 of the drawings, the illustrated historical temperature exposure monitor, referenced 11, is configured as a thin label suitable for application to a host product, or a host product package or container. The historical temperature exposure monitor 11 includes an upper layer 12 which can be clear or opaque. Upper layer 12 can be, for example, a printable sheet or film of plastic material on which is applied printed information, referenced as 13, for example, directions for use of historical temperature exposure monitor 11. Other historical temperature exposure monitor embodiments of the present disclosure can be configured without such an upper layer, if desired.

As used herein, "over", "overlaying", "under", and "beneath" and similar directional terms are used for convenience to the orientation of a historical temperature exposure monitor as shown in the drawings. A person of ordinary skill in the art will understand that a historical temperature exposure monitor can have any desired orientation in practice and may move through a variety of different of orientations during its life. In general, unless the context indicates otherwise, "over" and "overlaying" can refer to a direction toward a notional viewer or optical reading device, and "under" or "beneath" can refer to a direction opposite to the optical reading or viewing direction.

As shown, historical temperature exposure monitor 11 has a generally rectangular shape, with rounded corners. As will be understood, historical temperature exposure monitor 11 can have other suitable shapes, for example, circular, oval, angular, square, triangular, polygonal, hexagonal and strip-like.

Upper layer 12 has a window 15 overlooking a wick member 17 at an intermediate location along the length of wick member 17, or at another location, if desired, for example, at one end of wick member 17. Wick member 17 is an example of an indicator transport member that can be employed in some historical temperature exposure monitor embodiments of the present disclosure. Window 15 can function as a viewing port for optically reading or displaying the indicator signal generated by historical temperature exposure monitor 11, in an optical reading direction which can be generally downward, or at a downward angle, as viewed in FIG. 3 toward upper layer 12.

As shown in FIGS. 2 and 3, upper layer 12 can have any desired structure and configuration. For example, upper layer 12 can be a sheet or film of a flexible, imprint able plastic material. Suitable materials for upper layer 12 include polyethylene, polypropylene, a polycarbonate, a polyester, a polyamide, a polyurethane, a polyvinyl chloride, a cellulosic, a cellophane, and other plastic materials. If desired, upper layer 12 can be a laminate of two or more materials, for example a lidding film. To facilitate attachment of upper layer 12 to other components of historical temperature exposure monitor 11, upper layer 12 can be formed of a material suitable for heat-sealing to bottom layer 20, if desired. Optionally, upper layer 12 can bear a heat-sensitive coating on its underside to facilitate heat sealing. Also, upper layer 12 can be untreated, or can be treated on one or both surfaces to increase printability, if desired.

The historical temperature exposure monitor 11 generates an indicator signal from an indicator element which includes wicking member 17 and an indicator material. The indicator material can be solid and unresponsive when below a base temperature and liquid at or above an activation temperature, the activation temperature being above the base temperature. When in a liquid state, the indicator material can advance or move along wicking member 17 which functions as a transport member for the fluid indicator material.

In practicing the present disclosure, the indicator material can have a viscosity which is temperature related in a suitable manner so that the positional displacement or transport, of the indicator material along a transport member such as wicking member 17 relates to a desired integral of temperature over time in the liquid state. The relationship can be quantitative and predictable, and, optionally, can be measurable and/or quantitatively demarked on the historical temperature exposure monitor, for example, by a scale. For example, the indicator material viscosity can have a simple mathematical relationship to temperature. As already stated, the viscosity of the indicator material can decline with increasing temperature.

The relationship of the viscosity of the indicator material to temperature, in a temperature range of interest, can provide a smooth curve when plotted as a graph, which curve, desirably, is free of inflexions and discontinuities. The temperature range of interest can be from the melting point of the indicator material to an arbitrary maximum temperature, which can be the highest temperature the historical temperature exposure monitor is likely to encounter in normal use, for example, about 50° C., about 60° C. or about 70° C., or another suitable temperature.

The indicator material can have a temperature-related viscosity profile, or algorithm, which provides a rate of transport at a temperature, or within a temperature range, which is useful for monitoring the intended host product. The rate of transport can vary with temperature.

For example, the indicator material can have temperature-related viscosity characteristics that yield a rate of transport at a temperature of interest, or a temperature range of interest, that is such as to provide a conveniently detectable displacement of the indicator material at the end of a particular cumulative exposure at the temperature of interest, or in the temperature range of interest. The cumulative temperature exposure can be such as to be sufficient to induce a change in the host product that is to be monitored, for example, a loss of quality. The temperature range can be a range in which the host product can suffer a loss of quality, or other deleterious effects, in ordinary commercial circumstances, for example, the distribution, of a host product from a supplier to end users. The commercial circumstances can sometimes include conditions of storage by the end users prior to consumption or use of the host product.

The indicator material can have a viscosity, or viscosity profile, at a particular temperature, or a temperature range, that provides a rate of transport of the indicator material that is convenient for detection over a time period relevant to the host product, for example, an hour, a day, a week, a month, or more. The time period can relate to the time from the manufacture of the host product to its end use, including a possible storage period, or periods, during distribution, or can be determined in another suitable manner.

As illustrated in FIGS. 2 and 3, wick member 17 has a "dogbane", or dumbbell, shape and is secured beneath upper layer 12 in the optical reading direction. Wick member 17 can have any suitable configuration which provides a flow path, or flow paths, for the indicator material. For example, wick member can have an elongated shape, as shown, or an arcuate shape, or a ring-like shape, or can be configured as a longitudinal strip. Wick member 17 can be affixed to the underside of upper layer 12 in any suitable manner, for example, by adhesive contact areas 19 (only the right hand one of which is shown in FIG. 2) located at the extremities of wick member 17. Alternatively, wick member 17 can be secured or located in historical temperature exposure monitor 11 by attachment to, or contact with, other structure.

As shown in FIGS. 2 and 3, a reservoir 18 of initially solid indicator material is located in contact with wick member 17 at the left-hand end of wick member 17, as viewed in FIGS. 2 and 3. Alternatively, reservoir 18 can be disposed at another suitable location. Reservoir 18 can be, for example, a bead-like mass of solid indicator material deposited on wick member 17 in contact with the wick material. Other configurations of wick member 17 and dispositions of one or more reservoirs 18 are possible, some of which are described herein. However, reservoir 18 need not be in physical contact with wick member 17 provided that the indicator material can contact wick member 17 when liquid. For example, reservoir 18 can constitute a solid mass of indicator material that deforms, drips or drops to contact wick member 17, when the indicator material melts, if desired.

Wick member 17 is constructed to permit travel, or positional displacement, of liquid indicator material along wick member 17 toward window 15 for optical detection of the indicator material at window 15, or in optical alignment with window 15. For example, wick member 17, can be formed of a porous and absorbent material, such as filter paper, that permits the indicator material, when liquid, to permeate along wick member 17.

In an embodiment, the security material is mixed into and is a part of the indicator material in the reservoir 18, so that the security material flows together with the indicator material along wick member 17. Alternatively, the security material is not a part of the indicator material in the reservoir 18, and is distributed elsewhere, e.g. evenly on wick member 17. Alternatively, if the indicator material is opaque, it might cover the security material as it flows, so that only the part not covered by the indicator material is viewable and can be detected when exposed to the specific light wavelengths.

Suitable wick member materials include: various opaque or transparent papers, such as different grades of filter paper, including fine-pored and coarse-pored papers, non-woven fibrous materials formed of natural or synthetic fibers; pulverized filter paper; fine silica gel; porous films containing polytetrafluoroethylene resin or silica gel; TESLIN® microporous synthetic sheet (PPG Industries, Pittsburgh, Pa.); non-woven, spun bonded materials, including non-woven, spun-bonded high-density-polyethylene, polypropylene, and polyester; other non-woven, spun-bonded synthetic polymers; and non-woven, spun-bonded blends of any two or more such polymers.

Any suitable spacing can be employed between reservoir 18 and window 15, for example, a spacing of from about 1 mm to about 50 mm, or from about 3 mm to about 25 mm, or from about 5 mm to about 15 mm. Such spacing's are illustrative of spacing's that can be provided in historical temperature exposure monitor embodiments of the present disclosure between a reservoir of indicator material and an optical reading location, for example, window 15. The spacing can constitute a distance to be traveled by indicator material to provide an indicator signal. The spacing can be determined based on various parameters, for example, the rate of travel of the indicator material, the time-temperature response profile of the host product, the expected ambient temperature conditions, and the like.

In a historical temperature exposure monitor embodiments of the present disclosure, the time for indicator material to permeate from a reservoir such as reservoir 18 to a window such as window 15 can relate to the viscosity of the indicator material when liquid. The permeation time can also relate to the cumulative ambient exposure of the indicator material to temperatures above the melting point of the indicator material.

As already noted, some other possible arrangements for configuring the indicator material with a transport member include providing a plurality of reservoirs 18 each including solid indicator material. For example, a reservoir 18 can be provided at each end of wick member 17, equidistant from window 15. Such a configuration of two or more reservoirs can supply liquid indicator material in two flows to arrive nearly simultaneously at a viewing window such as window 15, filling the window more quickly than would a single flow. Such an indicator can have a sharper end point wherein the time from commencement of an indicator signal when indicator material first appears at the viewing window, to display of a complete or full signal, when the viewing window is filled with indicator material, is shorter.

As shown in FIGS. 1 and 2, when read together, to facilitate reading of a clear indicator signal in window 15, by concealing unnecessary information, upper layer 12 can be opaque in a region extending over reservoir 18, or over reservoir 18 and the portion of wick member 17 along which the indicator material travels to reach window 15, if desired. The entire extent of upper layer 12, can be opaque, if desired, with the exception of window 15.

The clarity of the indicator signal can be enhanced by employing optically contrasting materials for wick member 17 and the indicator material. For example, wick member 17 can be white, or another light color, and the indicator material can be a dark or an intense color, for example black, red or blue. Any other suitable color combinations can be employed, if desired. For example, the wick member can be dark colored and the indicator material can be light. However, an indicator signal which changes from light to dark may be more readily understood as an alert to a possible loss of quality. One or more background components optically contrasting with the indicator material can be provided at the viewing location, if desired.

In some embodiment, since the indicator material includes a security material, the indicator material can further generate another kind of optical signal, such as a bright appearance of a predetermined color when exposed to specific light wavelengths such as UV lights and special camera flashes or scanner light sources while being invisible/undetectable under normal lighting conditions.

Again referring to FIGS. 2 and 3 historical temperature exposure monitor 11 also includes a bottom layer 20 which, in various embodiments, can be a sheet or film formed of a plastics material, for example one of the materials described for upper layer 12. Bottom layer 20 can be formed of the same material as upper layer 12 or of a different material or materials. Bottom layer 20 can be opaque, if desired, to conceal the inner components of the indicator device. Bottom layer 20 can be sealed to the upper layer 12 in a suitable pattern that surrounds wick member 17 and the indicator material in reservoir 18. For example, bottom layer 20 can be adhered to upper layer 12 with adhesive or by heat sealing to form a perimeter seal extending around wick member 17 and reservoir 18. If desired, bottom layer 20 can form a pouch seemingly enclosing the operational elements of the indicator device.

As shown in FIG. 3, the outer surface of bottom layer 20 can be coated with an adhesive layer 24 of pressure-sensitive adhesive, or other suitable adhesive, to permit attachment of historical temperature exposure monitor 11 to a host product or a host product container or associated package or the like (none of which are shown). A removable release liner 25 can cover and protect adhesive layer 24 prior to attachment of historical temperature exposure monitor 11 to a host product, or an associated package or the like.

FIG. 2 shows historical temperature exposure monitor 11 adhered to an outer surface of a host product 26 by means of adhesive layer 24 (not visible in FIG. 2), after removal of release liner 25 (also not visible in FIG. 2). Structure 26 can alternatively indicate a package containing a host product.

The indicator element can have a thermal response algorithm that relates quantitatively to a time-temperature quality characteristic of the intended host product. The thermal response algorithm can be determined, and/or is defined, by the response of the indicator material to the temperature conditions it encounters when in the liquid state. Various embodiments of the present disclosure include a host product and a historical temperature exposure monitor according to the present disclosure, such as historical temperature exposure monitor 11, which is associated with the host product and which has a time-related thermal response algorithm that is related to the time-temperature quality characteristic of the host product.

One use of the historical temperature exposure monitor 11 shown in the drawings will now be described, for illustrative purposes. The exemplary embodiment of historical temperature exposure monitor 11 employs a white wick member 17, and a red-dyed indicator material containing a luminescent material (e.g., 18% Lumina Green Phosphorescent Pigment Powder), wherein the indicator material has a base temperature of 20° C. and an activation temperature of 30° C. These parameters are intended to be merely illustrative and indicator materials with other colors, other luminescent material or security material, and other temperature characteristics can be employed pursuant to this description.

In this example, the luminescent material (18% Lumina Green Phosphorescent Pigment Powder) is mixed into and be a part of the indicator material, and thus flows together with the indicator material along wick member 17. The positional displacement of the luminescent material is the same as that of the indicator material. The red-dyed indicator material having the luminescent material is initially placed in reservoir 18.

While the ambient temperature of the historical temperature exposure monitor remains below the base temperature of the indicator material, the indicator material remains solid and does not travel along wick member 17. Transparent window 15, which provides a view of wick member 17, accordingly has a white appearance provided by white wick member 17. The appearance can be determined visually, or by a camera, or in another suitable manner, by optically reading wick member 17 through viewing window 15 in the optical reading direction.

At ambient temperatures above the activation temperature, the indicator material having the luminescent material becomes a viscous liquid that migrates or flows along wick member 17 and quantitatively can record cumulative time-temperature exposure above the activation temperature. Thus, when experiencing a temperature above the activation temperature, the historical temperature exposure monitor self-activates because the indicator material becomes a flowable viscous liquid that begins to migrate or flow.

Depending upon the indicator material employed, at intermediate temperatures between the base temperature and the activation temperature, in some embodiments, the indicator material can advance slowly along wick member 17. The rate, or rates, of advance at intermediate temperatures can be slower than at temperatures at or above the activation temperature. For example, the advance at intermediate temperatures can be so slow as to be immaterial to the monitoring of temperature exposure above the activation temperature. Alternatively, the advance at intermediate temperatures can be useful for monitoring a host product parameter that is subject to slow change at intermediate temperatures, and to more rapid change at higher temperatures above the activation temperature.

The liquid indicator material has a viscosity which determines the rate of transport of the indicator material along wick member 17. The rate of transport of liquid indicator material on a wick member also can be referred to as the "wicking rate". The viscosity can vary with temperature. For example, the viscosity can decrease with temperature so that at higher temperatures the indicator material moves more quickly with respect to wick member 17, or another suitable transport member. At lower temperatures, the viscosity is higher, and the indicator material moves more slowly. Thus, the indicator material displacement can be indicative of the duration of the exposure to different temperatures and the indication is cumulative because the indicator material cannot retreat. If the ambient temperature falls below the melting temperature of the indicator material, the indicator material solidifies, remaining stationary, until the temperature rises again.

The temperature-related viscosity profile of the indicator material can determine the total positional displacement, or degree of advance, of the indicator material with respect to wick member 17, or another suitable transport member, under a given pattern of time-related temperature conditions. The historical temperature exposure monitor embodiments of the present disclosure can employ indicator materials having a temperature-related viscosity profile that provides a predictable displacement in response to a desired cumulative temperature exposure over time. The viscosity of the indicator material, and the distance traveled by the indicator material with respect to the transport member can vary with temperature, in a consistent manner, to provide a quantitative record of cumulative time-temperature exposure, according to the nature of the indicator material employed.

The liquid indicator material can advance a fixed distance in response to a particular cumulative time-temperature exposure above the activation temperature of historical temperature exposure monitor 11. The fixed distance can be the distance from reservoir 18 to window 15, a particular distance along a graduated displacement scale (not shown) that can be marked on historical temperature exposure monitor 11, or another fixed distance.

The particular cumulative time-temperature exposure value for which a historical temperature exposure monitor embodiment can be calibrated, or otherwise provided, can be determined by the heat-response characteristics of the host product. The historical temperature exposure monitor can signal when the exposure value has been reached as a result of ambient conditions experienced by the historical temperature exposure monitor. The ambient conditions can be unpredictable and can comprise a longer period at a steady temperature slightly above the activation temperature, a shorter period at a higher temperature, or various periods at different temperatures at or above the activation temperature. The indicator material can advance to provide a particular displacement indicative of the sum over time of the ambient temperature conditions to which the historical temperature exposure monitor and the indicator material are exposed.

The indicator material can be selected in accordance with the temperature-response properties of a host product to be monitored, so that indicator material can fill window 15 substantially or completely following a cumulative time-temperature exposure likely to cause a loss of host product quality.

Ambient temperatures above the activation temperature cause the indicator material to continue to migrate along wick member 17 until it reaches window 15, changing the appearance of window 15 from white to red under normal lighting conditions and further gives bright appearance of the predetermined color of green when exposed to UV lights while being invisible under normal lighting conditions, and signaling that an end point has been reached. At a temperature just above the activation temperature, the indicator material can move relatively slowly and at higher temperatures the indicator material can move more rapidly as the viscosity of the indicator material declines with increasing temperature. Thus, the displacement of the molten indicator material along wick member 17 from reservoir 18 to window 15 can be a measure of the cumulative temperature exposure above the activation temperature over time. The appearance change of window 15 from white to red and the appearance of the bright appearance of the predetermined color of green when exposed to UV lights can indicate that the historical temperature conditions experienced by a host product with which the indicator is associated may have impaired the quality of the host product.

Once the appearance of wick member 17 at window 15 has changed, cooling of historical temperature exposure monitor 11 below the activation temperature or the base temperature does not reverse the appearance change. The exemplary indicator cannot change back from red to white and the bright appearance of the predetermined color of green under UV lights will not disappear. Rather, cooling causes the indicator material to solidify in place, for example, spread out along wick member 17, "locking in" the historical record of temperature exposure. If wick member 17 is porous, the indicator material can be impregnated into the pores in an effectively permanent manner.

If the temperature of the indicator material drops below the activation temperature before the indicator material progresses to the viewing window, the indicator material can solidify and cease to flow along the wick member 17 or other transport member. If the ambient temperature then returns to a level above the activation temperature, the indicator material again can melt and continue to advance along wick member 17 or other transport member, recording the new time-related exposure to an elevated temperature or temperatures. In this way, the historical temperature exposure monitor can monitor fluctuations in ambient temperature and record cumulative time-temperature exposure.

Many variations of the structure of a historical temperature exposure monitor embodiment of the present disclosure are possible, only some of which are described herein. For example, a transport member, if employed, can have an arcuate configuration, a convoluted configuration, or another shape. Two, or more than two, indicator material reservoirs can be employed, for example, three or four indicator material reservoirs. Furthermore, multiple indicator material reservoirs, if employed, can supply the indicator material, when liquid, to a single optical reading location. For this, or other purposes, the transport member, or transport members can provide multiple pathways along which the indicator material can advance, for example, multiple pathways along the radii of a circle, or of a ring, or polygon, extending towards a viewing location at the center of the circle, or of the ring or the like. Such embodiments can provide a sharp end point at the viewing location as multiple indicator flows converge and fill the window.

Figure 4:
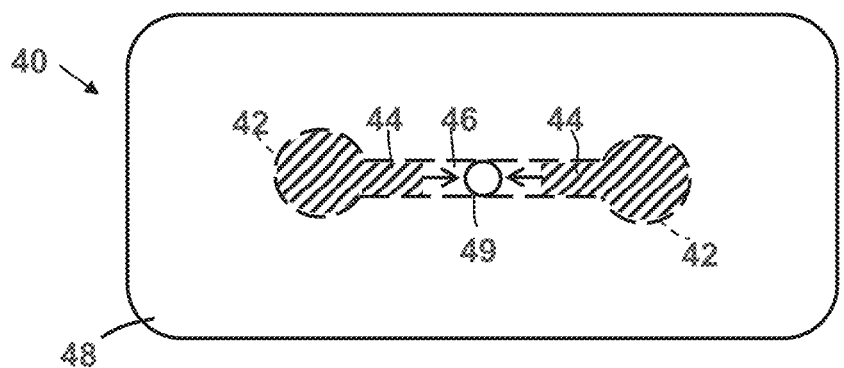
FIG. 4 is a top plan view of another embodiment of the historical temperature exposure monitor according to the present disclosure, which employs two reservoirs of indicator material.

FIG. 4 illustrates an embodiment of a historical temperature exposure monitor according to the present disclosure, referenced 40 in FIG. 4 that employs two indicator material reservoirs 42. Historical temperature exposure monitor 40 includes an indicator element that comprises two reservoirs 42 of indicator material 44. Reservoirs 42 are located at the opposite ends of a light-colored, dogbane-shaped wick member 46 that is disposed beneath an opaque upper layer 48 of the indicator. Indicator material 44 is supported by wick member 46 and is in contact with it. In an embodiment, indicator material 44 comprises a luminescent material which is evenly mixed into indicator material 44.

A window 49 is formed in upper layer 48 and is located approximately equidistantly between reservoirs 42 to permit a central zone of wick member 46 to be viewed. Historical temperature exposure monitor 40 has a base temperature and an activation temperature determined by the nature of indicator material 44. In use, when historical temperature exposure monitor 40 is exposed to an ambient temperature above its activation temperature, indicator material 44 melts and flows away from reservoirs 42 towards window 49, in two opposed, convergent streams moving in the direction of the arrows shown in the center of FIG. 4. Shortly after reaching the perimeter of window 49, the two streams of indicator material 44 can rapidly fill window 49 with indicator material 44, providing a sharp end point. For example, all or some of the flows can arrive at the window at about the same time, rapidly filling the window and providing a sharp end point wherein the time from the first appearance of indicator material at the viewing window to filling of the window area is short.

Instead of two reservoirs 42, other embodiments of historical temperature exposure monitor 40 can have three, or four, or more, reservoirs of indicator material, each with its own flow pathway to a viewing window, provided by a wick member, or other suitable transport member. Each of the flow pathways can be essentially straight, as shown in FIG.

4, if desired. Alternatively, the flow pathways can be curved, or otherwise configured, to extend the distance between each respective reservoir and the viewing window thereby delaying the arrival of the indicator material at the viewing window. The flow paths can have equal flow lengths so that each flow arrives at the viewing window at about the same time.

Historical temperature exposure monitor 40 is illustrative of some of the variations that can be made to historical temperature exposure monitor 11 shown in FIGS. 1-3, and in the several elements of historical temperature exposure monitor 11. Such variations can also be made to other embodiments of historical temperature exposure monitor according to the present disclosure, if desired, unless they would appear to be impractical.

Figure 5:
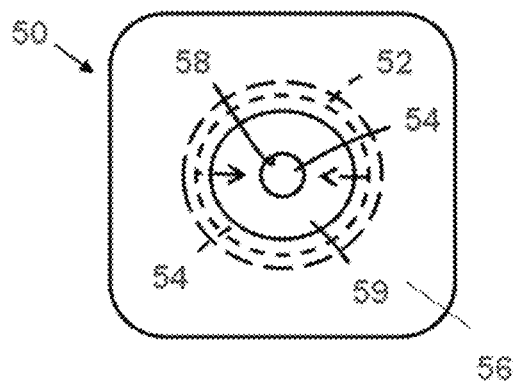
FIG. 5 is a top plan view of a further embodiment of the historical temperature exposure monitor according to the present disclosure, which employs a ring of indicator material.

FIG. 5 illustrates a further embodiment of the historical temperature exposure monitor according to the present disclosure, which is referenced 50 in FIG. 5, and which is configured to promote the display of a sharp end point signal. Historical temperature exposure monitor 50 has an indicator element that comprises a ring of colored indicator material 52 that extends around the perimeter of a disc-shaped wick member 54, at or near the outer peripheral edge of wick member 54.

Wick member 54 supports indicator material 52 in contact with the wick material and is disposed beneath an opaque upper layer 56 of historical temperature exposure monitor 50. A window 58 is provided in upper layer 56 approximately in the center of wick member 54. Window 58 is disposed approximately centrally of the ring of indicator material 52. Window 58 can permit a central zone of wick member 54 to be optically displayed externally of historical temperature exposure monitor 50 for viewing by a human observer, or by a viewing device. Upper layer 56 can bear a reference ring 59, showing the end point appearance of the indicator material, to facilitate the reading of the signal given by historical temperature exposure monitor 50, if desired.

At temperatures above the activation temperature, the indicator material 52 melts and flows inwardly towards window 58, as shown by the arrows in FIG. 5. The configuration of indicator material 52 in a ring around wick member 54 can cause a front of molten indicator material 52, which front can be approximately ring-shaped, to converge on the center of wick member 54, providing a sharp end point as the indicator material 52, reaching window 58 from multiple directions, or as a continuous ring, quickly fills the viewing zone provided by window 58.

By disposing the ring of indicator material 52 at or near the outer periphery of the disc provided by wick member 54, the molten indicator material 52 is unable to flow outwardly and is thus constrained to flow inwardly towards the middle of the disc, toward the center of wick 54, i.e., in the case of a circular ring of indicator material 52, approximately radially.

Indicator material 52 can be configured as a circular ring, as shown or can have other another shape that encourages a convergent flow of the indicator material 52 toward a central location on wick member 54 for example a triangle, a square, a hexagon or another regular polygon. The ring can be continuous or can be formed by a number of ring portions separated by spaces, for example, discrete dots and/or dashes.

Wick member 54 can have an outer perimeter approximately conforming to the outer periphery of the indicator material, if desired. Modified wick shapes are possible. For example, wick member 54 can resemble a spoked wheel and comprise a number of spokes to support travel of liquid indicator material from ring 52 toward a central region viewable through window 58.

Historical temperature exposure monitor 50 is also illustrative of variations that can be made to historical temperature exposure monitor 11 shown in FIGS. 1-3, and in the several elements of historical temperature exposure monitor 11. Such variations can be made to other embodiments of historical temperature exposure monitor according to the present disclosure, if desired, unless they would appear to be impractical.

Some embodiments of historical temperature exposure monitor according to the present disclosure can give a nuanced signal, indicating a number of stages of cumulative temperature exposure over time. The indications of the multiple stages can be displayed for reading by a human viewer or an optical device. For example, instead of, or in addition to, a window for viewing an end point event, such embodiments can include an elongated transport member along which an indicator material can flow and, optionally, graduations can be marked adjacent to the transport member, to quantify the advance of the indicator material along the transport member and relate specific displacements of the indicator material along the transport member to the likely condition of a host product experiencing the temperature exposure. In such embodiments, an upper layer of the historical temperature exposure monitor, can be sufficiently transparent in a region or regions aligned with the transport member to permit progress of the indicator material along the transport member to be read optically through the upper layer.

Such a multi-stage historical temperature exposure monitor can be quantitatively correlated with the temperature response characteristics of the host product to provide a suitable relationship between indicator material displacement and the likely condition of the host product. A suitable relationship can be provided by appropriate selection of indicator material, transport member and indicator geometry, including distances to be traveled by the indicator material along the scale, or other markings, referring to relevant teaching herein.

In an embodiment, the indicator material comprises a security material such as a luminescent material or a photochromic material, and optionally comprises a regular dye. As an illustration in this example, the security material is a luminescent material, and the specific light wavelengths are UV lights. The luminescent material flows together with the indicator material along the transport member.

Figure 6:
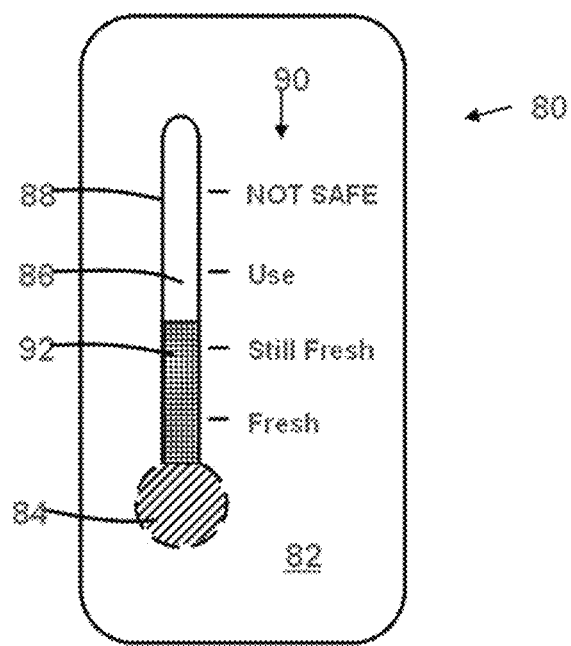
FIG. 6 is a top plan view of a still further embodiment of the historical temperature exposure monitor according to the present disclosure, which employs a graduated flow of indicator material.

For example, FIG. 6 illustrates a further construction of a historical temperature exposure monitor, referenced 80 in FIG. 6, that can indicate a number of stages of the condition of a host product. Historical temperature exposure monitor 80 has an indicator element that can display an extended flow of an indicator material along a linear flow path, for example, a rectilinear or curved flow path, in response to an appropriate temperature exposure over time. The indicator element can include multiple markings spaced along the flow path to indicate the progress of the indicator material along the flow path. For example a linear flow can be viewed against a graduated scale. The indicator material can comprise a security material without a conventional pigment or regular dye; or alternatively, the indicator material can comprise both a security material and a conventional pigment or regular dye. The security material flows together with the indicator material along the transport member.

For this and other purposes, historical temperature exposure monitor 80 includes an upper layer 82, a reservoir 84 of solid indicator material, and an elongated transport member 86 that is externally viewable for a substantial part of its length, or throughout its length.

As shown, upper layer 82 is opaque and conceals reservoir 84 from view. An elongated window 88 permits transport member 86 to be viewed. However, upper layer 82 can be transparent, or transparent in an appropriate region of transport member 86, so that transport member 86 is externally viewable, or optically readable, and no window 88 is required. Also, reservoir 84 can be exposed to view, if desired, by configuring upper layer 82 to be transparent over reservoir 84, or configuring window 88 to extend over reservoir 84, if desired.

Upper layer 82 bears markings, labeled generally by arrow 90 in FIG. 6, adjacent transport member 86 to demark the progress of the indicator material along transport member 86. Markings 90 are spaced at graduated intervals along transport member 86, corresponding with specific stages of cumulative temperature exposure, and each marking is labeled with a likely condition that a host product with which historical temperature exposure monitor 80 is intended to be used will have as a result of the cumulative temperature exposure indicated. Four exemplary condition descriptions are shown in FIG. 6, namely, "Fresh", "Still Fresh", "Use", and "NOT SAFE", which condition descriptions are self-explanatory. Other conditions, and/or other labels can be employed, if desired.

Window 88 can be configured to extend only over the region of transport member 86 that is adjacent to markings 90, if desired, or can have any other suitable configuration. For example, instead of providing a continuous view of an extended region of transport member 86 in the vicinity of markings 90, as shown in FIG. 6 and described herein, window 88 can be configured with multiple ports, one for each marking 90 to provide an "on/off" indication for the temperature exposure stage represented by each marking.

Employing an indicator material that has predictable temperature-viscosity characteristics, such as described herein, the spacing's of markings 90 along transport member 86 can be determined to correspond approximately with particular cumulative time-temperature values. Markings 90 are shown with approximately regular spacing in FIG. 6, but other spacing can be employed, if desired.

Indicator materials with various temperature response characteristics can be employed to correlate with, or match, different host products having different temperature response characteristics to enable the same configuration of historical temperature exposure monitor 80, with the same set of markings 90, to be employed with the different host products. Alternatively, different indicator materials can be employed with different indicator configurations having sets of markings 90 with different geometries, to provide a diversity of indicators useful for monitoring the same host product while providing different information.

In use, historical temperature exposure monitor 80 can be associated with a host product, for example by being incorporated into a label that is adhered to the host product or to host product packaging. As the host product experiences an extended exposure, or repeated exposures to a temperature or temperatures above the respective activation temperature for historical temperature exposure monitor 80, the indicator material advances along transport member 86 indicating the cumulative temperature exposure. A strip 92 of indicator material is shown in FIG. 6 as having advanced to a point between the "Still Fresh" marking and the "Use" marking.

Historical temperature exposure monitor 80 is also illustrative of variations that can be made to historical temperature exposure monitor 11 shown in FIGS. 1-3, and in the several elements of historical temperature exposure monitor 11. Such variations can also be made to other embodiments of historical temperature exposure monitor according to the present disclosure, if desired, unless they would appear to be impractical.

A reference marking can be provided, if desired, which has a similar appearance to the end point appearance of the indicator, to facilitate reading of the indicator signal. The reference marking can be, for example, a ring around the optical reading location, or another shaped marking on the indicator which is colored red or has another optical character similar to the optical characteristic or characteristics the indicator employs for signaling.

Further referring to FIG. 6, the historical temperature exposure monitor 80 is configured to have viewable window 88 to extend from the reservoir 84 over the region of transport member 86 that is adjacent to markings 90 to the end viewable "NOT SAFE" point. The indicator material is modified to include a SCC polymer described herein above and a luminescent material without a conventional pigment or regular dye. The SCC polymer is in white color in its initial state and changes to be transparent when melts upon an exposure to a temperature above the activation temperature. The historical temperature exposure monitor 80 is configured to have a white transport member 86 so that the historical temperature exposure monitor does not change color and remains in white color along the viewable window 88 under normal lighting conditions. Although the historical temperature exposure monitor 80 does not change its color and remains white under normal lighting conditions even when the indicator material flows along the viewable window 88, the viewable window 88 filled with the indicator material gives a bright appearance of a predetermined color when exposed to UV lights while invisible under normal lighting conditions.

This historical temperature exposure monitor 80 is desirable for certain retailers and suppliers to attach to a host product to continuously monitor the freshness or quality of the host product by checking the position of the bright appearance of the predetermined color along the viewable window 88 utilizing UV lights while invisible/undetectable under normal lighting conditions to the customers. The historical temperature exposure monitor can therefore be used an invisible historical temperature exposure monitor to human eyes under normal lighting conditions. Furthermore, the historical temperature exposure monitor gives the bright appearance of the predetermined color which can be used to securely monitor the authenticity of the historical temperature exposure monitor 80 and thus the host product for anti-counterfeiting protection.

The historical temperature exposure monitor 80 can be further modified to install a separate cumulative historical temperature exposure monitor in a small round button shape at the end viewable "NOT SAFE" point. The separate cumulative historical temperature exposure monitor is configured to change color from white to a dark color viewable under normal lighting conditions upon the predetermined cumulative heat exposure. The historical temperature exposure monitor is further configured so that the time for indicator material to reach the end viewable "NOT SAFE" point is the same as the time for the separate cumulative historical temperature exposure monitor to change color from white to the dark color upon the same predetermined cumulative heat exposure indicating the host product is perished and not safe to use. This modified historical temperature exposure monitor 80 is beneficial for certain retailers and suppliers to attach to a host product and continuously monitor the freshness or quality of the host product by checking the position of the bright appearance of the predetermined color along the viewable window 88 utilizing UV lights while invisible/undetectable under normal lighting conditions to the customers. The customers can only see a color change from white to a dark color at the end viewable "NOT SAFE" point when the host product is not safe to be used.

Figure 7:
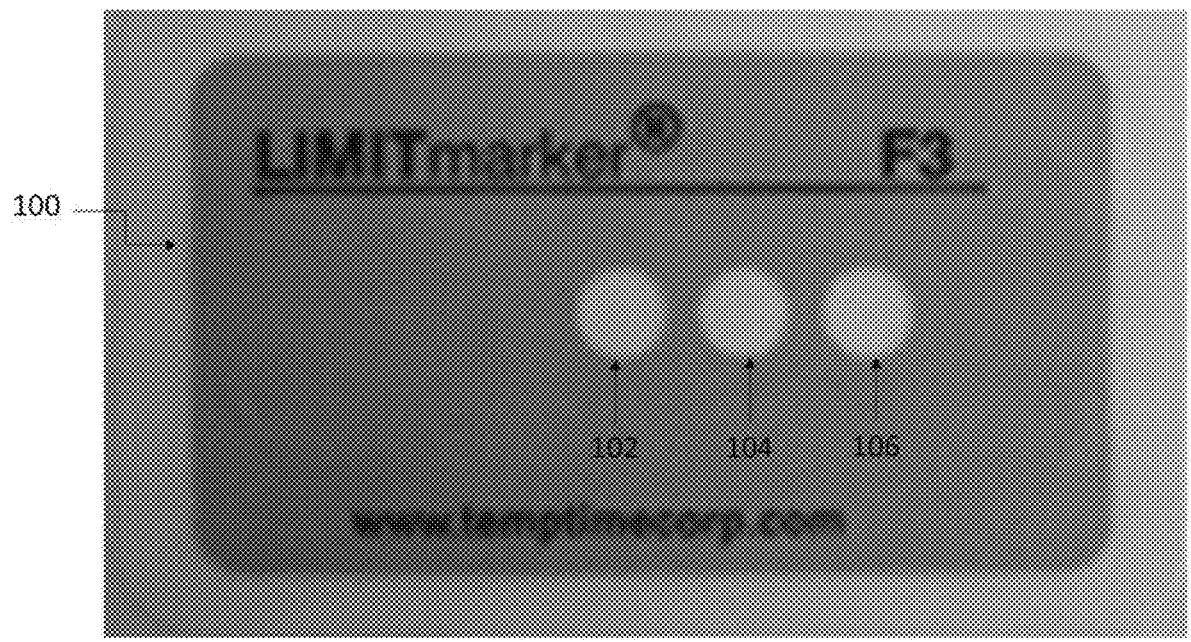
FIG. 7 is a top plan view of a still further embodiment of the historical temperature exposure monitor according to the present disclosure, which employs a graduated flow of indicator material with three viewable windows.

Referring to FIG. 7, an example of historical temperature exposure monitor 100 is provided which has a similar structure as historical temperature exposure monitor 80 in FIG. 6, except that it has three viewable windows 102, 104, and 106 that are externally viewable as shown in FIG. 7 instead of a big elongated viewable window 88 as shown in FIG. 6. The operation mechanism of historical temperature exposure monitor 100 is the same as that of historical temperature exposure monitor 80 in FIG. 6.

The historical temperature exposure monitor 100 is modified to have an opaque upper layer 82 which conceals the reservoir 84 and the elongated transport member 86 from view except for the three viewable windows 102, 104, and 106. The three viewable windows 102, 104, and 106 can be configured to correlate to different status of the host product, such as "Fresh", good to "use" and "not safe" to use respectively. The indicator material includes a transport material such as a SCC polymer described herein above. The indicator material further includes a luminescent material without a conventional pigment or regular dye. The indicator material turns from a white solid to a transparent viscous liquid upon melting and flows along the transport member 86 from the reservoir 84 to the three viewable windows in the order of the viewable windows 102, 104 and 106. The viewable window 106 is the end "NOT SAFE" point. The viewable windows 102, 104 and 106 do not change color under normal lighting conditions even when the indicator material fills these three viewable windows but the viewable windows 102, 104 and 106 give a bright appearance of the predetermined color when exposed to the UV lights when the indicator material fills these three viewable windows. When the indicator material flows to the last viewable window 106, the viewable window 106 does not change color under normal lighting conditions, but gives a bright appearance of the predetermined color when exposed to the UV lights indicating that the host product is perished or is not safe to be used. This historical temperature exposure monitor can thus function as an invisible historical temperature exposure monitor to customers under normal lighting conditions, but can allow certain retailers or suppliers to attach the historical temperature exposure monitor 100 to a host product to continuously monitor the freshness of the host product by checking the position of the bright appearance of the predetermined color along the three viewable windows 102, 104 and 106 utilizing UV lights.

Referring to FIG. 7 again, the historical temperature exposure monitor 100 can be further modified to include a separate cumulative temperature indicator in a small round button shape at the last viewable window 106. The separate cumulative temperature indicator is configured to change color from white to a dark color viewable under normal lighting conditions upon a predetermined cumulative heat exposure. The historical temperature exposure monitor is further configured so that the time for indicator material to reach the viewable window 106 is the same as the time for the separate cumulative temperature indicator to change color from white to the dark color upon the same predetermined cumulative heat exposure indicating the host product is perished and not safe to use. The viewable windows 102 and 104 do not change color and remain white under normal lighting conditions even when the indicator material flows to these two viewable window 102 and 104, but give a bright appearance of a predetermined color when exposed to UV lights. The viewable window 106 changes color from white to the darker color under normal lighting conditions and gives a bright appearance of a predetermined color under UV lights when the indicator material flows to the viewable window 106. This historical temperature exposure monitor 100 is desirable for certain retailers and suppliers to attach the historical temperature exposure monitor 100 to a host product to continuously monitor the freshness of the host product by checking the position of the bright appearance of the predetermined color along the viewable windows 102, 104 and 106 utilizing UV lights, while the customer can only see the color change of the last window 106 indicating the host product is perished or not safe to be used.

Referring to FIG. 7 again, the indicator material of the historical temperature exposure monitor 100 can be modified further to comprise both a luminescent material and a conventional pigment or regular dye. The viewable windows 102, 104 and 106 change color under normal lighting conditions and further give the bright appearance of the predetermined color when under UV lights when the indicator material fills these three viewable windows 102, 104 and 106.

The historical temperature exposure monitor can respond continuously throughout any period or periods of exposure to temperatures above the activation temperature, for example, with an ongoing displacement of an indicator material with respect to a transport member that is quantitatively related to cumulative time-temperature exposure and proceeds at different rates according to the prevailing temperature.

Activation Temperature. A historical temperature exposure monitor according to the present disclosure can be configured to have an activation temperature which is relevant to the temperature response characteristics of the host product, for example, by selection of a suitable indicator material. The activation temperature can correspond with a threshold temperature at, or above, which the host product can deteriorate, or risks deterioration, or another suitable temperature.

Some examples of activation temperatures for which a historical temperature exposure monitor according to the present disclosure can be configured include an activation temperature in a range of from about −20° C. to about 70° C. and, from about −10° C. to about 60° C., from about −10° C. to about 5° C., from about −3° C. to about 5° C., from about 5° C. to about 50° C., from about 10° C. to about 40° C., or from about 20° C. to about 30° C. Other activation temperatures can be provided, if desired. For example, lower activation temperatures, including sub-zero temperatures down to about −34° C. can be obtained using a suitable indicator material one example of which is a side-chain crystallizable polymer such as poly(dodecylmethacrylate).

Furthermore, the activation temperature can be close to the base temperature or can be somewhat above the base temperature, if desired, depending upon the particular indicator material employed. For example, the activation temperature can exceed the base temperature by a temperature in a range of from about 1° C. to about 60° C.; in a range of from about 1° C. to about 50° C.; a range of from about 3° C. to about 20° C.; or a range of from about 5° C. to about 15° C. In some cases, the activation temperature can be the same as the base temperature.

Base Temperature. A historical temperature exposure monitor according to the present disclosure can be configured to have a base temperature which is relevant to the temperature response characteristics of the host product, for example, by selection of a suitable indicator material. The base temperature can be a temperature below which the host product is unlikely to deteriorate during a period of possible usefulness of the historical temperature exposure monitor, or another suitable temperature. The period of possible usefulness of the historical temperature exposure monitor can be about one week, about one month, about one year, from about two years to about five years, or more, or another suitable period. Some examples of base temperatures may include a base temperature in a range of from about –10° C. to about 50° C.; from about –5° C. to about 40° C.; from about 0° C. to about 30° C.; and from about 10° C. to about 20° C.

Some host products can be stable at cool temperatures, for example, at a cool temperature below a range of from about 10° C. to about 15° C., for extended periods, for example, for 20 days to 100 days or more. However, the host product can deteriorate rapidly at room temperatures of about 25° C. or higher, for example in a period of from about 12 hr. to about 72 hr. or less, and can deteriorate even more rapidly at higher temperatures, of about 35° C. or higher, for example, in about 0.5 to about 5 hr. or less. At intermediate temperatures in the range of from about 15° C. to about 25° C., the host product may deteriorate slowly, for example, in about 3 days to about 20 days, or more.

Using a suitable indicator material, a historical temperature exposure monitor embodiment of the present disclosure can be designed to correlate with such host product temperature response characteristics by configuring the historical temperature exposure monitor with a base temperature in the range of from about 15° C. to about 20° C. and an activation temperature of about 25° C. For example, the historical temperature exposure monitor can employ an indicator material having a melt onset temperature of about 15° C. to about 20° C., a melting temperature of about 25° C., and a viscosity, when liquid, that declines with increasing temperature.

Below the base temperature, the indicator material does not flow significantly. At intermediate temperatures above the melt onset temperature, the indicator material can flow slowly and provide an end point after an appropriate number of days, for example, after about 3 days to about 20 days. At about 25° C., the indicator material can melt, and while the temperature remains above 25° C. can flow more quickly on or through the transport member, generating an end point signal in about 12 hr. to about 72 hr. or less depending upon the ambient temperatures. If the temperature rises above about 35° C. for long enough, the viscosity of the indicator material drops and an end point signal can be generated more quickly in about 0.5 to about 5 hr. or less.

Transport Member. The transport member can be porous and/or absorbent and the indicator material can be absorbable by the transport member, for example, by capillary attraction of the transport member material for the liquid indicator material. The indicator material, when in the liquid state, can contact the transport member. Desirably, the transport member has affinity for the indicator material. For example, some useful transport member materials can be wetted by the indicator material. Some examples of suitable materials that can be employed for the transport member, as sole or partial components of the transport member, include: Ahlstrom 601 and 631 paper (Ahlstrom Corp. at www.ahlstrom.com), Whatman grade 1 qualitative paper and chromatography paper 1 Chr, 2 Chr, and 3 Chr (Whatman Inc. of Clifton, N.J. and www.whatman.com.) Other woven, nonwoven, fibrous, non-fibrous reticulated, or non-reticulated, porous materials can be employed, if desired.

Alternatively the transport member can comprise or consist of a nonporous material. For example, the indicator material can be hydrophobic, so that the liquid indicator material can adhere to a surface of the transport member by hydrophobic-hydrophobic attraction and flow across the transport member surface toward a viewing location. Some examples of suitable hydrophobic transport member materials include hydrophobic polymers and copolymers of olefins, ethylene, propylene, vinyl chloride, carbonates, urethanes, acrylics, vinyls, vinyl chlorides, vinylidene chlorides, styrenes, amides, imides, esters, ethers, and fluorocarbons. If desired, the transport member can be hydrophilic, for example, for use with a hydrophilic transport material.

The transport member can be configured with structures to guide and facilitate the indicator material flow, if desired, for example, matt surfacing, surface texturing or roughening, one or more surface grooves and/or capillary channels extending toward the viewing location or combinations of two or more of the foregoing structural features. Optionally, the transport member can be configured to provide multiple material flow paths. Multiple transport members can be employed in a single historical temperature exposure monitor, if desired.

Indicator Material. The indicator material can be an individual material or a composition, or combination of two or more materials. For example, the indicator material can include a transport material and, optionally, an optically distinctive material such as a security material or a regular dye. The indicator material can consist solely of the transport material or solely of the transport material and the optically distinctive material. A transport material having an optically distinctive characteristic of its own, for example, an intense color under normal lighting conditions in comparison with the indicator component that provides a viewing background, such as a transport member, can be used without an additional optically distinctive material, if desired. A regular dye may also have an intense color under normal lighting conditions, in comparison with the viewing background, such as a transport member. Either or both the transport material and the optically distinctive material can consist of one or more ingredients.

The optically distinctive material may include a security material such as a luminescent material or a photochromic material, as described previously in the present disclosure. The optically distinctive material may also include a regular dye. The optically distinctive material can provide a contrasting appearance to that of the surrounding structure, optionally by providing a bright contrasting color (regular dye) under normal lighting conditions; or a bright appearance of a predetermined color (luminescent material) or a change of color state (photochromic material) when exposed to specific light wavelengths. For an indicator signal with good color intensity, the dye can be dissolved in the polymer to saturation. The dye can have any suitable hue, for example, red or orange, or another hue, some of which are described elsewhere herein.

The transport material can provide the indicator material with desired mechanical characteristics such as remaining solid below the base temperature and melting or otherwise changing to a flowable phase of appropriate viscosity above the activation temperature. The liquid indicator material viscosity can vary with temperature, decreasing with temperature increase, if desired. The optically distinctive material, if employed, can provide one or more useful optical characteristics which help the historical temperature exposure monitor generate a distinct end point signal.

Indicator materials useful in the practice of the present disclosure, in which multiple ingredients are employed, can be formulated with any of a wide range of proportions of those ingredients. The indicator material can include a major proportion of transport material, for example, a proportion of transport material of at least about 60 wt. %, at least about 80 wt. %, at least about 90 wt. %, at least about 95 wt. %, or at least about 98 p wt. %, based on the weight of the indicator material.

Optionally, the indicator material can include from about 0.05 wt. % to about 50 wt. %, from about 0.05 wt. % to about 40 wt. %, from about 0.05 wt. % to about 10 wt. %, or from about 10 wt. % to about 40 wt. % of the security material, based on the weight of the indicator material. If desired, the proportion of the security material can be from about 0.1 wt. % to about 5 wt. %, or from about 0.5 wt. % to about 2 wt. %, based on the weight of the indicator material.

Examples of the characteristics of the indicator materials are found in the in U.S. Pat. Nos. 9,546,911 and 8,671,871, which are fully incorporated herein by reference for all purposes.

Transport Material. Various materials can be employed as a transport material. Optionally, the transport material can be hydrophobic. As stated, the transport material can have affinity for the transport member. For example, the transport material and the transport member can both be hydrophobic. In this case, the transport material, when liquid, can wet the transport member, if desired. The transport material can form a suitable contact angle with the transport member, for example, a contact angle of less than 90°, less than 45°, or less than 30°. In some embodiments, the transport member and the transport material can be hydrophilic or have some hydrophilic character.

The transport material can be, or can include, a suitable synthetic polymeric material, if desired. The synthetic polymeric material can be solid when at or below the base temperature and can be a viscous liquid when at or above the activation temperature. The synthetic polymeric material can include one or more polymers, one or more copolymers or a mixture of one or more polymers with one or more copolymers. Also, the synthetic polymeric material can provide any one or more of the transport material properties described herein, if desired. For example the synthetic polymeric material can include a side chain crystallizable (SCC) polymer.

Various suitable synthetic polymer materials, suitable SCC polymers or other suitable transport materials useful for practice of the present disclosure and the characteristics of these materials are found in U.S. Pat. Nos. 9,546,911 and 8,671,871, which are fully incorporated herein by reference for all purposes.

Some side-chain crystallizable (SCC) polymers useful in the practice of the present disclosure, alone or in combination, and methods that can be employed for preparing them, are described in O'Leary et al. "Copolymers of poly(n-alkyl acrylates): synthesis, characterization, and monomer reactivity ratios" in *Polymer* 2004 45 pp 6575-6585 ("O'Leary et al." herein), and in Greenberg et al. "Side Chain Crystallization of n-Alkyl Polymethacrylates and Polyacrylates" *J. Am. Chem. Soc.*, 1954, 76 (24), pp 6280-6285 ("Greenberg et al." herein). The disclosure of each of O'Leary et al. and Greenberg et al. is incorporated by reference herein for all purposes.

Suitable side-chain crystallizable (SCC) polymers useful in the practice of the present disclosure are also described in U.S. Pat. No. 5,156,911 at column 5, lines 67 to column 7, line 13, which disclosure is incorporated by reference herein for all purposes. Some useful side-chain crystallizable polymers, and monomers for preparing side-chain crystallizable polymers, are also available from commercial suppliers, for example, Scientific Polymer Products, Inc., Ontario, N.Y., Sigma-Aldrich, Saint Louis, Mo., TCI America, Portland Oreg., Monomer-Polymer & Dajac Labs, Inc., Trevose, Pa., San Esters Corp., New York, N.Y., Sartomer USA, LLC, Exton Pa., and Polysciences, Inc.

EXAMPLES

Example 1

Experimental Details

An initial experiment was performed using materials identical to a VVM2 available from Temptime Corporation, located at 116 The American Road, Morris Plains, N.J. 07950.

HEATmarker® VVM time-temperature indicators give visual warning of potentially damaging cumulative heat exposures and indicate to health workers whether a vaccine can be used. Critical to the quality of a vaccine is the cumulative exposure to temperature over time, measured by the Mean Kinetic Temperature (MKT). HEATmarker® VVM is a label containing a heat-sensitive material that is affixed to a vaccine vial by the drug manufacturer to allow for full-life heat monitoring. Since the HEATmarker® VVM and the vaccine move through the supply chain together, they are exposed to the same conditions and MKT. This allows the HEATmarker® VVM to give health workers an overview of the cumulative heat exposure of the vaccine and a clear indication when it has reached its time-temperature end point.

VVM2-like cumulative heat indicators are prototype cumulative heat indicators formulated to respond to approximately 2 days at 37° C., and intended to be similar to the commercially available HEATmarker® VVM2, available from Temptime Corporation. VVM2 has a well-characterized temperature response profile and is manufactured to meet World Health Organization requirements provided in PQS Performance Specification, Vaccine Vial Monitor WHO/PQS/E06/IN05.2, 26 Jul. 2011. It responds in 2 days at 37° C. and 225 days at 5° C.

The following UV-luminescent inks and pigments were incorporated into either cumulative VVM2-like active ink, 40° C. SCC Emulsion Threshold ink, 9° C. SCC solvent-based polymer, or a 9° C. alkane wax blend (40% hexadecane/60% pentadecane): Opticz Green Luminescent-UV ink; Direct Glow Red UV Ink; UMC Luminova Green Phosphorescent pigment powder (G-300 STM); and Red ZnS pigment powder.

Hand prototype (drop prints) environmental monitors of the HM-02 (VVM)-like active ink and the SCC emulsion based ink containing the UV responsive and phosphorescent pigments were prepared by using 2 mil PET clear film with VVM reference ring. The HM-02 (VVM)-like active ink was placed on a paper substrate and covered over with the VVM reference ring PET film. The SCC emulsion based inks were placed on a separate film layer, covered over with a layer of only SCC emulsion to increase the opacity, masking the UV responsive layer prior to melting. Inks were dried and then laminated onto either a clear PET film layer, or a substrate providing a dark background. The appearance of each prototype environmental monitors was noted at room temperature and after heating above 40° C., both with and without UV light exposure.

Hand prototype environmental monitors of the SCC solvent-based polymers and alkane waxes containing the phosphorescent pigments were manufactured by dispensing ink onto blank LM-F indicators (chromatography paper) and STV trays (Porex discs, PTFE). The appearance of each prototype environmental monitors was observed below and above the melt temperature under both normal and UV lighting conditions (e.g., using a 365 nm flashlight).

Results and Observations

Inks containing UV-responsive or phosphorescent pigments were formulated and coated in a thin layer to a substrate (e.g., a LM-F wick paper or a 2 mil PET clear film) as shown in Table 3. For example, the HM-02 (VVM) active ink sample with a phosphorescent pigment was formulated and coated in a thin layer onto a 2 mil PET clear film which were then covered with a VVM reference ring PET film. All coatings were dispensed onto the prototypes at room temperature conditions. The appearance of each prototype was noted before and after heating under both normal lighting conditions and with a UV flashlight (365 nm wavelength). The phosphorescent pigments from different suppliers used in this example are summarized in Table 4.

Figure 13:
FIG. 13 is an example of 40° C. SCC Emulsion Polymer environmental monitor Prototypes with UV Ink, according to an example embodiment in Example 1 of the present disclosure.

FIG. 13 illustrates the results of the same set of 40° C. SCC Emulsion Polymer prototypes with or without UV Ink under different testing conditions: SCC emulsion with Green UV ink (left), SCC emulsion with no UV ink (middle), and SCC emulsion with Red UV ink (right).

Prototype images shown in FIG. 13 represent a 2-layer PET film construction with drop print ink, with the top film layer being SCC emulsion threshold ink only and the bottom film layer being SCC emulsion threshold ink containing UV ink (either 15% Green UV ink or 28% Red UV ink).

As shown in FIG. 13A, prior to the melting of the SCC polymer in the prototypes above the threshold temperature (e.g., at room temperature conditions), the active square of each sample appears white and show no differences under normal lighting conditions. However, as shown in FIG. 13B, when the prototypes were exposed to UV lighting, color differences appear as the inks containing UV components glow either bright green or red/pink, while the SCC only appearance does not change.

As shown in FIG. 13C, after heating the porotypes above the threshold temperature (e.g., >40° C.), the opaque white SCC polymer changes to clear and appears transparent/

TABLE 3

Summary of the compositions of different the UV-responsive ink samples and the phosphorescent ink samples.

| Temperature Sensitive Ink | Sample ID | UV-Luminescent Component | Prototype Construction |
|---|---|---|---|
| HM02 (VVM active) Ink | 1253-35 A | 26.5% Luminova Green Phosphorescent Pigment Powder | VVM Reference - PET film |
| 40° C. SCC Emulsion Ink | 1253-32 A1 | 15% Opticz Green Lumi-UV Ink | VVM Reference - PET film |
|  | 1253-32 B | 28% Direct Glow Red UV Ink | VVM Reference - PET film |
|  | 1253-32 C | 27% Luminova Green Phosphorescent Pigment Powder | VVM Reference - PET film |
| 9° C. SCC solvent-based polymer | 1253-32 D | 37.5% Luminova Green Phosphorescent Pigment Powder | LM-F wick paper |
| 9° C. SCC solvent-based polymer + Alkane wax blend | 1253-32 E1 | 18% Luminova Green Phosphorescent Pigment Powder | LM-F wick paper STV Porex Discs |
| 9 ° C. SCC solvent-based polymer + Pentadecane | 1253-32 F | 19% Red ZnS Phosphorescent Pigment Powder | LM-F wick paper STV Porex Discs |

TABLE 4

Summary of Phosphorescent Ink Samples

| Supplier | Sample ID | Chemical Composition | Particle Size | Appearance in Normal Light | Appearance under UV Light (365 nm) |
|---|---|---|---|---|---|
| UMC, Luminova | 1253-20 A | Strontium Aluminate | 10-40 um | White/Yellow | Bright Green |
| TechnoGlow | 1253-20 C | Strontium Aluminate | <15 um | White | Bright Green |
|  | 1253-20 E | CaS | 35 um | White | Bright Red |
|  | 1253-16 B | ZnS | <50 um | Light Pink | Bright Red |
| Isuo Chemical | 1253-20 D | ZnS | 10-45 um | White | Bright Red |
| LDP LLC, Camera Flash Pigment | 1253-20 B | SiO2 beads | 30-50 um | Colorless | N/A[1] |

In Table 4 above, the camera flash pigment ink appears invisible under normal lighting conditions and a bright white image is captured during flash photography.

colorless under normal lighting conditions, while as shown in FIG. 13D, the prototypes with the UV inks gives a brightly colored active center under UV light exposure.

Example 2

Figure 14:
FIG. 14 is an example of 40° C. SCC Emulsion Polymer environmental monitor Prototypes with Phosphorescent Pigment, according to an example embodiment in Example 2 of the present disclosure.

FIG. 14 illustrates the tests results of the same set of 40° C. SCC emulsion polymer prototypes with a phosphorescent pigment. All prototypes shown in FIG. 14 represent 40° C. SCC emulsion polymer containing 27 wt. % Luminova green phosphorescent pigment. Under normal lighting conditions, samples appear opaque white prior to heating as shown in FIG. 14A, and change to colorless/transparent showing the substrate dark background after heating above 40° C. as shown in FIG. 14C. The bright green color however can be observed before and after heating when the samples were exposed to UV light, as shown in FIGS. 14B and 14D. Additionally, the phosphorescent pigment also shows "after-glow" effects for a short time, and remain brightly colored seconds after the UV light source is removed.

Example 3

Figure 15:
FIG. 15 is an example of Cumulative VVM Active Ink (HM02) environmental Prototypes with Phosphorescent Pigment, according to an example embodiment in Example 3 of the present disclosure.

FIG. 15 illustrates the tests results of the same set of Cumulative VVM Active Ink (HM02) Prototypes with phosphorescent pigment under different test conditions.

The prototype samples in FIG. 15 represent 26.5 wt. % Luminova green phosphorescent pigment mixed into cumulative VVM active ink (right) and cumulative VVM active ink without pigment (left), as shown in FIG. 15A before the heat exposure. Before heating, as shown in FIG. 15B, VVM ink with the Luminova green phosphorescent pigment glowed brightly when exposed to UV (and seconds after UV light source was remove), while VVM ink with no phosphorescent pigment showed no color change when exposed to UV light. After heating, both VVM prototypes changed dark under normal lighting conditions as shown in FIG. 15C. However, distinct color differences were observed after illuminating with UV light, and the VVM ink with the Luminova green phosphorescent pigment glowed brightly when exposed to UV light, as shown in FIG. 15D.

Example 4

Figures 16A, 16B:
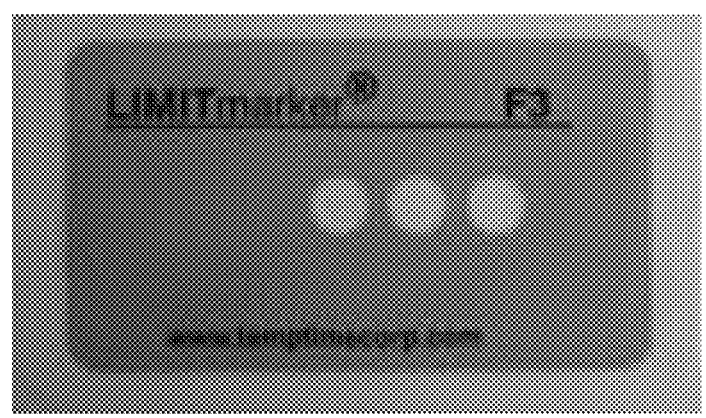
FIGS. 16A and 16B are examples of 9° C. Alkane Wax-SCC Polymer Blend environmental monitor Prototypes with Phosphorescent Pigment, according to an example embodiment in Example 4 of the present disclosure.

FIG. 16A illustrates the tests results of the same set of 9° C. Alkane Wax-SCC Polymer Blend Prototypes with phosphorescent pigment Prototype samples in FIG. 16A represent 18 wt. % of Luminova green phosphorescent pigment mixed into an alkane wax-SCC polymer blend ink formulation. After dispensing a small amount onto a porous substrate, the color is undetected under normal lighting conditions, but appears brightly colored green with UV exposure. As long as the sample is kept below the threshold temperature (e.g., at 5° C.), the wax blend is immobile and does not move. After heating above the threshold temperature (e.g., at room temperature) the wax blend travels in the x-y direction of the porous substrate. This alkane wax movement however is visually observed upon exposure to UV light.

FIG. 16B illustrates an example of using a blue flood coat to cover the temperature sensitive ink with the phosphorescent pigment on the porous substrate of the prototype shown in FIG. 16A, so that the bright green color can be viewed only at the three viewable windows under UV light.

Example 5

Figure 17:
FIG. 17 is an example of 9° C. Alkane Wax environmental monitor Prototypes with Red Phosphorescent Pigment, according to an example embodiment in Example 5 of the present disclosure.
Figure 17:
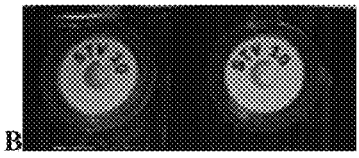
Figure 17:
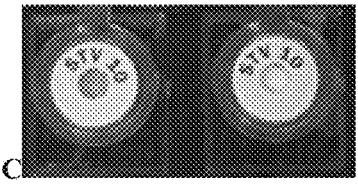
Figure 17:
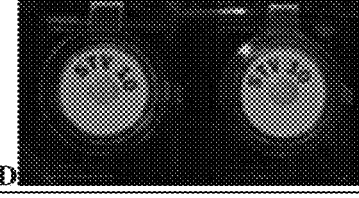

FIG. 17 illustrates the tests result of the same set of 9° C. Alkane Wax under different test conditions. Each image in FIG. 17 shows the same set of prototype samples under different conditions: Alkane wax with 19 wt. % of red ZnS phosphorescent pigmented ink (left) and control sample with no pigment (right).

As shown in FIG. 13, before heating, the images of the prototypes were taken for alkane wax containing the Red ZnS pigment that were frozen for 5 minutes, and then after activation by heating the prototypes above the activation temperature, the images of the prototypes were taken immediately upon activation.

Phosphorescent pigment dispersed into alkane wax dispensed onto Porex discs demonstrates the feasible use in an activatable indicator platform.

After activating the indicator and prior to heating above the threshold temperature, the viewing window of each sample appears white, as shown in FIG. 17A. Furthermore, upon UV light exposure no color is observed, as shown in FIG. 17B.

After melting (i.e., warming at room temperature conditions), no color change is observed under normal lighting conditions as shown in FIG. 17C, however, after seconds after UV exposure, bright red color is distinctly seen as shown in FIG. 17D.

The environmental monitors of the present disclosure may usefully be employed to monitor the condition of any of a wide range of heat-sensitive host products. Host products that may be monitored include, in addition to vaccines: temperature-sensitive health care products, for example, drugs, medicaments, pharmaceuticals, pharmaceuticals incorporating a polypeptide, a nucleic acid or cellular material, temperature-sensitive medical devices, temperature-sensitive prophylactics and the like; biological materials for industrial or therapeutic uses, for example cultures, organs, and other human or animal body parts, blood, and perishable blood products; diagnostic devices, diagnostic kits containing perishable products, and perishable diagnostic ingredients; batteries, battery-containing devices, battery-containing appliances; fresh or prepared foodstuffs, including fish, meats, dairy products, fruits, vegetables, baked goods, desserts, and the like; food service products, including restaurant service foods; gourmet food products; perishable animal foods; cut and uncut flowers; plants; cosmetics, for example cosmetics containing biologicals or other labile or perishable ingredients; beauty aids; perishable industrial products; paint; solder; perishable munitions and ordnance; and perishable decontamination packs and products.

The environmental monitors of the present disclosure may be a small, flexible, low-cost temperature event recorder capable of being manufactured easily such as by printing and suitable for attachment to small items such as vaccine vials or bottles. For example, the environmental monitor can be capable of being printed directly on product labels or packaging. Environmental monitors of the present disclosure may be associated with a host product in a variety of ways, for example by adhering, tying, looping, stapling or otherwise affixing the dual-function exposure indicator, or a label or tag embodying the dual-function exposure indicator, to a desired host product, either directly to a host product, or to a package containing the host product, or to a package, carton, box or other container containing a number of host product items. Also, the dual-function environmental monitor, label, or tag, may be inserted in a host product package, carton, or other container for one or more host product items.

The term "a change of color state" of a material as used herein means that material has a change of reflectivity, a change in transparency, a change in hue, a change in apparent color, and combinations thereof.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of the present disclosure are described herein, including the best mode known to the inventor for carrying out the embodiments of the present disclosure. Of course, variations on these described embodiments will become apparent to those of ordinary skill in the art upon reading the foregoing description. The inventor expects skilled artisans to employ such variations as appropriate, and the inventor intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments of the present disclosure disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Furthermore, if any references have been made to patents and printed publications throughout this disclosure, each of these references and printed publications are individually incorporated herein by reference in their entirety for all purposes.

In closing, it is to be understood that the embodiments disclosed herein are illustrative of the principles of the present disclosure. Other modifications that may be employed are within the scope of this disclosure. Thus, by way of example, but not of limitation, alternative configurations of the embodiments of the present disclosure may be utilized in accordance with the teachings herein. Accordingly, the present disclosure is not limited to that precisely as shown and described.

The invention is claimed as follows:

1. A historical temperature exposure monitor comprising:
a substrate;
an optically readable, thermally sensitive indicator element supported by the substrate, the indicator element further comprising an indicator material configured to move in response to a predetermined temperature exposure; and
a security material supported by the substrate and further comprising:
a luminescent material configured to emit light of a predetermined color responsive to being exposed to specific light wavelengths.

2. The historical temperature exposure monitor of claim 1, where the predetermined temperature exposure is selected from the group consisting of freezing exposure, thawing exposure, peak temperature exposure, cumulative heat exposure, and combinations thereof.

3. The historical temperature exposure monitor of claim 1, wherein the luminescent material is, prior to exposure to the specific light wavelengths, undetectable to a naked eye under ambient lighting conditions.

4. The historical temperature exposure monitor of claim 1, wherein the appearance of a predetermined color is undetectable to a naked eye.

5. The historical temperature exposure monitor according to claim 1, wherein the specific light wavelengths are in a range selected from the group consisting of 10-400 nm, 10-380 nm, 10-100 nm, 100-280 nm, 280-315 nm, 315-400 nm, 180-380 nm, 180-400 nm, 100-400 nm, 100-315 nm, 280-400 nm, 400-500 nm, 700 nm-1 mm, 700 nm-1.1 µm, about 780 nm-1.4 µm, 1.4-3 µm, and 3 µm-1 mm.

6. The historical temperature exposure monitor according to claim 1, wherein the security material includes the luminescent material which comprises (a) at least one component selected from the group consisting of: a phosphorescent material, a fluorescent material, a phosphorescent dye, a phosphorescent ink, a fluorescent dye, and a fluorescent ink.

7. The historical temperature exposure monitor according to claim 1, wherein the luminescent material is configured to emit light of the predetermined color when exposed to the specific light wavelengths, and the emission of light of the predetermined color remains for at least a predetermined interval after cessation of illumination with the specific light wavelengths.

8. The historical temperature exposure monitor according to claim 7, wherein the predetermined interval is 0.1-60 seconds.

9. The historical temperature exposure monitor according to claim 7, wherein the predetermined interval is 1-15 seconds.

10. The historical temperature exposure monitor according to claim 9, wherein the luminescent material includes an UV ink selected from the group consisting of a green UV ink, a blue UV ink, a pink UV ink, a yellow UV ink, a red UV ink, a clear UV ink, and combinations thereof.

11. The historical temperature exposure monitor according to claim 1, wherein the luminescent material is a phosphorescent component selected from the group consisting of Green Phosphorescent Pigment Powder, Red ZnS Phosphorescent Pigment Powder, Red CaS Phosphorescent Pigment Powder, Strontium Aluminate, CaS, ZnS, $SiO_2$, Calcium Sulfide, Strontium Aluminate Euporium Dysprosium, Yttirium Oxide, ZnS:Cu, and combinations thereof.

12. The historical temperature exposure monitor according to claim 1, wherein the indicator element is inactive below a base temperature and being thermally responsive at or above an activation temperature to record irreversibly with respect to time cumulative ambient temperature exposure above the activation temperature, the activation temperature being equal to or greater than the base temperature.

13. The historical temperature exposure monitor according to claim 11, wherein the indicator material is a meltable solid at or below the base temperature in its initial state, and melts to be a viscous liquid at or above a determined temperature and begins to flow.

14. The historical temperature exposure monitor according to claim 12, wherein the indicator element comprises a transport member supporting the indicator material, a displacement of the indicator material is a displacement with respect to the transport member, and a displacement of the security material is a displacement with respect to the transport member.

15. The historical temperature exposure monitor according to claim 13, wherein the security material is mixed into and is part of the indicator material, so that the security material is displaced with respect to the transport member together with the indicator material, and the displacement of the security material is the same as the displacement of the indicator material.

16. The historical temperature exposure monitor according to claim 13, wherein the security material is not part of the indicator material and a displacement of the indicator material conceals or reveals the security material.

17. A historical temperature exposure monitor comprising:
a substrate;
an optically readable, thermally sensitive indicator element supported by the substrate, the indicator element further comprising an indicator material configured to move in response to a predetermined temperature exposure; and
a security material supported by the substrate and further comprising
a photochromic material configured to temporarily change color state responsive to being exposed to the specific light wavelengths.

18. The historical temperature exposure monitor according to claim 17, wherein the photochromic material comprises at least one component selected from the group consisting of an organic metal compound including triarylmethanes, stilbenes, azastilbenes, nitrones, fulgides, spiropyrans, naphthopyrans, spiro-oxazines, quinones, photochromic quinones, phenoxynaphthacene quinone, diarylethenes, azobenzenes, and dithizonates of metals; an inorganic photochromic compound including silver chloride, silver halides, zinc halides, yttrium oxyhydride, silicate photochromic glasses containing silver halide microcrystals including AgBr or AgCl, activated crystals of alkali metalhalide compounds including KCl, KBr or NaF, and doped salts or oxides of alkaline-earth metals including $CaF_2$/La, Ce or $SrTiO_3$/Fe+Mo; a photochromic coordination compound including a sodium nitroprusside compound or a ruthenium sulfoxide compound; and combinations thereof.

19. The historical temperature exposure monitor according to claim 18, wherein the photochromic material comprises at least one component selected from the group consisting of spiropyrans, naphthopyrans, and spirooxazines.

20. The historical temperature exposure monitor of claim 17, wherein the change of color state of the photochromic material is a change in reflectivity, a change in transparency, a change in hue, and/or a change in apparent color when exposed to the specific light wavelengths.

21. The historical temperature exposure monitor of claim 17, where the predetermined temperature exposure is selected from the group consisting of freezing exposure, thawing exposure, peak temperature exposure, cumulative heat exposure, and combinations thereof.

22. The historical temperature exposure monitor of claim 17, wherein the security material includes the photochromic material which is undetectable to a naked eye under ambient lighting conditions before the photochromic material changes color state responsive to being exposed to the specific light wavelengths.

23. The historical temperature exposure monitor of claim 17, wherein the security material includes the photochromic material which is undetectable to the naked eye after the photochromic material changes color state when exposed to the specific light wavelengths.

24. The historical temperature exposure monitor according to claim 17, wherein the specific light wavelengths are in a range selected from the group consisting of 10-400 nm, 10-380 nm, 10-100 nm, 100-280 nm, 280-315 nm, 315-400 nm, 180-380 nm, 180-400 nm, 100-400 nm, 100-315 nm, 280-400 nm, 400-500 nm, 700 nm-1 mm, 700 nm-1.1 µm, 780 nm-1.4 µm, 1.4-3 µm, and 3 µm-1 mm.

25. The historical temperature exposure monitor according to claim 17, wherein the security material includes the photochromatic material which comprises a photochromic ink, a photochromic dye, an infrared-reflecting material, an ultraviolet-reflecting material, an infrared-absorbing material, an ultraviolet-absorbing material, an optically refractive material, an optically diffractive material, a holographic material, Strontium Aluminate, CaS, ZnS, and $SiO_2$, and a phosphorescent pigment powder.

26. The historical temperature exposure monitor according to claim 17, wherein the indicator element is inactive below a base temperature and being thermally responsive at or above an activation temperature to record irreversibly with respect to time cumulative ambient temperature exposure above the activation temperature, the activation temperature being equal to or greater than the base temperature.

27. The historical temperature exposure monitor according to claim 17, wherein the indicator material is a meltable solid at or below the base temperature in its initial state, and melts to be a viscous liquid at or above a determined temperature and begins to flow.

28. The historical temperature exposure monitor according to claim 26, wherein the indicator element comprises a transport member supporting the indicator material, a displacement of the indicator material is a displacement with respect to the transport member, and a displacement of the security material is a displacement with respect to the transport member.

29. The historical temperature exposure monitor according to claim 27, wherein the security material is mixed into and is part of the indicator material, so that the security material is displaced with respect to the transport member together with the indicator material, and the displacement of the security material is the same as the displacement of the indicator material.

30. The historical temperature exposure monitor according to claim 27, wherein the security material is not part of the indicator material and a displacement of the indicator material conceals or reveals the security material.

* * * * *